(12) United States Patent
Ishihara et al.

(10) Patent No.: US 12,703,364 B2
(45) Date of Patent: Aug. 11, 2026

(54) AUTONOMOUS CONTROL SYSTEM AND AUTONOMOUS CONTROL METHOD

(71) Applicant: Hitachi, Ltd., Tokyo (JP)

(72) Inventors: Shinji Ishihara, Tokyo (JP); Masaki Kanai, Tokyo (JP); Teppei Saitoh, Tokyo (JP); Ryu Narikawa, Tokyo (JP); Kazuya Sugimoto, Tokyo (JP); Tadashi Kotani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 125 days.

(21) Appl. No.: 18/748,299

(22) Filed: Jun. 20, 2024

(65) Prior Publication Data

US 2025/0010861 A1 Jan. 9, 2025

(30) Foreign Application Priority Data

Jun. 30, 2023 (JP) ................................ 2023-107897

(51) Int. Cl.
*B60W 30/18* (2012.01)
*B60W 60/00* (2020.01)

(52) U.S. Cl.
CPC .... *B60W 30/18154* (2013.01); *B60W 60/001* (2020.02); *B60W 2554/4029* (2020.02); *B60W 2554/4041* (2020.02)

(58) Field of Classification Search
CPC ........... B60W 30/18; B60W 30/18154; B60W 60/001; B60W 60/0025; B60W 60/00274; B60W 2554/4029; B60W 2554/4041
USPC ........................................................... 701/23
See application file for complete search history.

(56) References Cited

U.S. PATENT DOCUMENTS 11,092,976 B2 * 8/2021 Koga ..................... H04N 7/185
11,345,340 B2 * 5/2022 Shalev-Shwartz .... B60W 30/09
12,487,596 B1 * 12/2025 Sadilek ................ G05D 1/0088
2009/0173820 A1 * 7/2009 Bock ......................... F41G 7/22 244/3.15
2015/0224845 A1 * 8/2015 Anderson ............ B60G 17/019 701/37
2016/0207538 A1 * 7/2016 Urano ................. B60W 30/182
2017/0123434 A1 * 5/2017 Urano .............. G08G 1/096791
2019/0084579 A1 * 3/2019 Maura ............... B60W 50/0098
2020/0192367 A1 * 6/2020 Choi ................... B60W 30/143
2021/0370924 A1 12/2021 Kuno et al.
(Continued)

FOREIGN PATENT DOCUMENTS

DE 102020212577 A1 * 10/2021 ...... B60W 30/18163
JP WO2017149628 A1 * 12/2018 ........... G01C 21/005
(Continued)

*Primary Examiner* — Atul Trivedi
(74) *Attorney, Agent, or Firm* — MATTINGLY & MALUR, PC

(57) ABSTRACT

An autonomous control system includes a state amount acquiring unit that acquires the information of a control target, a control target position identification unit, a control target reaching region calculation unit, an outside information acquiring unit, a target distinguishing unit, a non-control target position identification unit, a non-control target reaching region calculation unit, an intersection region calculation unit, a control parameter setting unit, and an operation amount calculation unit that calculates a control input such that the value of an objective function J becomes a smaller value than the previous value.

11 Claims, 18 Drawing Sheets

(56) References Cited

U.S. PATENT DOCUMENTS

| | | | | |
|---|---|---|---|---|
| 2022/0081878 | A1* | 3/2022 | Phadtare | E02F 3/841 |
| 2022/0388536 | A1* | 12/2022 | Kothbauer | B60W 60/0011 |
| 2023/0037767 | A1* | 2/2023 | Yang | G08G 1/167 |
| 2023/0140569 | A1* | 5/2023 | Foster | B60W 30/146 701/400 |
| 2023/0148202 | A1* | 5/2023 | Goto | B60W 60/0011 701/26 |
| 2023/0202473 | A1* | 6/2023 | Shalev-Shwartz | B60W 30/146 701/93 |
| 2023/0373516 | A1* | 11/2023 | Won | B60K 35/223 |
| 2024/0131705 | A1* | 4/2024 | Ye | B25J 9/1664 |
| 2024/0147888 | A1* | 5/2024 | Kakkar | A01B 69/008 |
| 2025/0073897 | A1* | 3/2025 | Ohnishi | B60W 60/001 |

FOREIGN PATENT DOCUMENTS

| | | | | |
|---|---|---|---|---|
| JP | 2021-187207 | A | 12/2021 | |
| JP | 2022512359 | A * | 2/2022 | E02F 9/262 |
| WO | WO-2022156309 | A1 * | 7/2022 | G06F 16/245 |
| WO | WO-2022249218 | A1 * | 12/2022 | B60W 60/0011 |
| WO | WO-2023080114 | A1 * | 5/2023 | E02F 9/24 |
| WO | WO-2024087712 | A1 * | 5/2024 | B60W 60/00272 |
| WO | WO-2024111596 | A1 * | 5/2024 | E02F 9/261 |
| WO | WO-2024204510 | A1 * | 10/2024 | B66C 13/48 |
| WO | WO-2025057361 | A1 * | 3/2025 | B60W 60/00 |
| WO | WO-2025215559 | A1 * | 10/2025 | G01C 21/3841 |

* cited by examiner

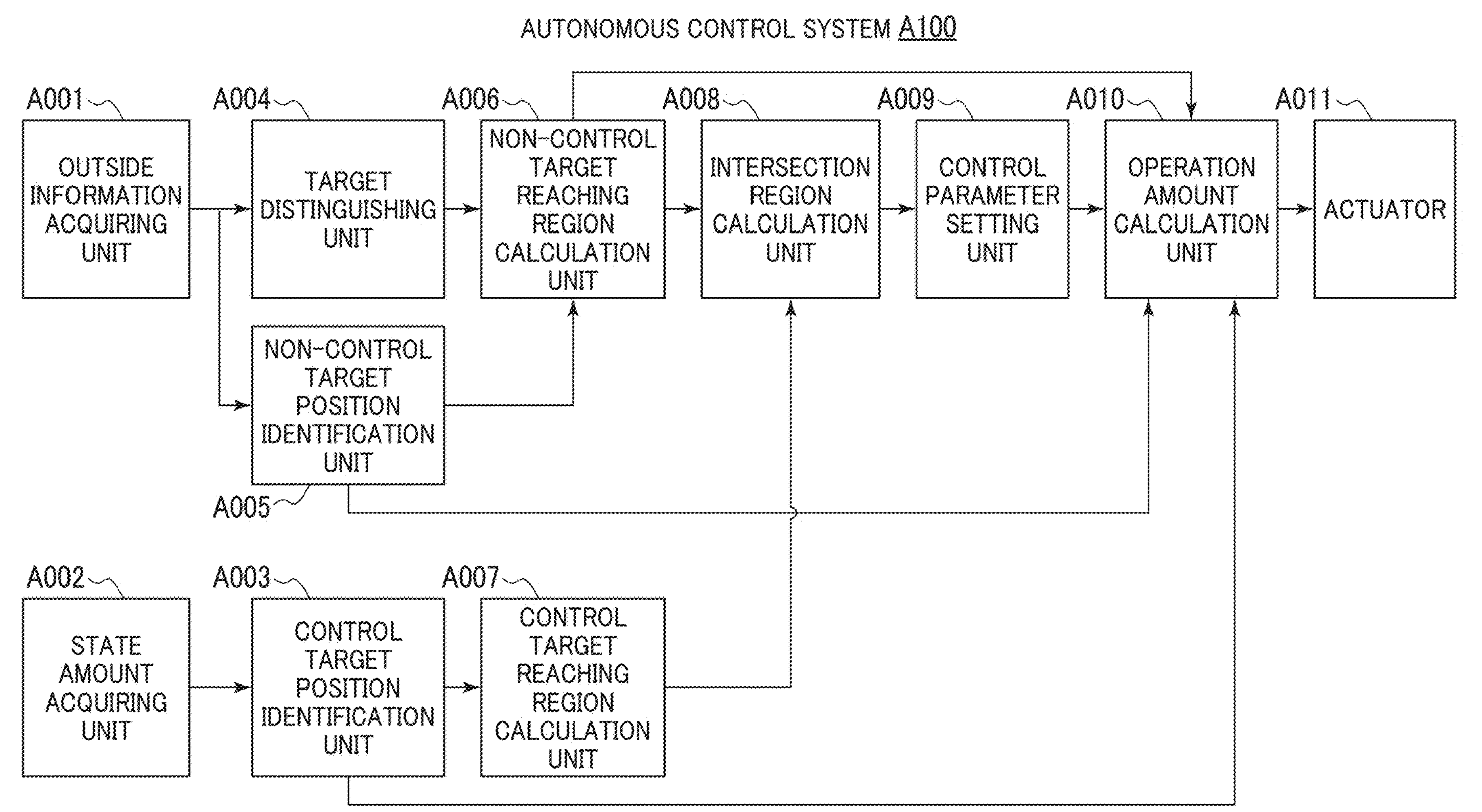
FIG. 1
AUTONOMOUS CONTROL SYSTEM A100
A001
OUTSIDE INFORMATION ACQUIRING UNIT
A004
TARGET DISTINGUISHING UNIT
A006
NON-CONTROL TARGET REACHING REGION CALCULATION UNIT
A008
INTERSECTION REGION CALCULATION UNIT
A009
CONTROL PARAMETER SETTING UNIT
A010
OPERATION AMOUNT CALCULATION UNIT
A011
ACTUATOR
NON-CONTROL TARGET POSITION IDENTIFICATION UNIT
A005
A002
STATE AMOUNT ACQUIRING UNIT
A003
CONTROL TARGET POSITION IDENTIFICATION UNIT
A007
CONTROL TARGET REACHING REGION CALCULATION UNIT $$A_{iw} = a_i A_{ia} + b_i A_{ib} + \cdots \quad i = 1,2$$

AUTONOMOUS CONTROL SYSTEM AND AUTONOMOUS CONTROL METHOD

CROSS-REFERENCE TO RELATED APPLICATION

The present application claims priority from Japanese application JP2023-107897, filed on Jun. 30, 2023, the content of which is hereby incorporated by reference into this application.

TECHNICAL FIELD

The present invention relates to an autonomous control system and an autonomous control method regarding a safety assistance function in an autonomous driving vehicle or a semi-autonomous driving vehicle.

BACKGROUND ART

In recent years, to reduce traffic accidents and traffic jams, development of an autonomous driving technology has been advanced.

The autonomous driving technology attracts expectations also in the logistics industry in which labor shortage is serious. The autonomous driving technology is developed over a wide range, not only to a truck that performs parcel collection and delivering on a general road, but also to a forklift used for collecting and storing articles in a factory and a warehouse, a conveying robot called an AGV (Automatic Guided Vehicle) and an AMR (Autonomous Mobile Robot), an inter-process conveying vehicle, and the like.

The autonomous driving technology is used in, except for a fully automated large logistics warehouse, an environment in which a human (mainly, a pedestrian) and a non-autonomous vehicle (for example, a forklift operated by an operator) are mixed. Therefore, an autonomous driving vehicle is required to have a safety function so as not to come into contact with the pedestrian and the non-autonomous vehicle.

Typically, to achieve such a safety function, a trajectory in which the pedestrian and the non-autonomous vehicle may move is predicted, and the autonomous driving vehicle is controlled such that the predictive trajectory and the own vehicle do not come into contact with each other.

The non-autonomous vehicle is mainly dominated in its movement by a nonholonomic constraint, and thus, cannot move directly to the side and cannot perform sudden direction change, whereas the pedestrian can freely move in various directions, so that the predictive trajectory calculation itself is not easy.

With respect to such problems, Patent Literature 1 discloses that a vehicle is started to be decelerated at a first deceleration speed at a first point of time, and thereafter, when an intersection target is still present at a second point of time immediately before a point of time at which the vehicle cannot be stopped at a position immediately before an intersection region even when the vehicle is started to be decelerated at a second deceleration speed higher than the first deceleration speed, a driving assistance device starts to decelerate the vehicle at the second deceleration speed at the second point of time.

CITATION LIST

Patent Literature

Patent Literature 1

Japanese Unexamined Patent Application Publication No. 2021-187207

SUMMARY OF INVENTION

Technical Problem

Patent Literature 1 considers, as a collision condition, an intersection region between a region that can be present when the own vehicle maintains the present speed (vehicle speed) and a region that can be present when an obstacle maintains the present target speed (candidate target speed) and orientation.

Consequently, there is a possibility that ideal driving assistance cannot be performed with respect to the obstacle that can take movement different from a predicted behavior, such as a child who suddenly starts running and a drunken person who does not fix his/her moving direction.

The present invention has been devised to solve the problems as above, and an object of the present invention is to provide an autonomous control system and an autonomous control method in which even when it is difficult to predict a behavior of a non-control target that is a moving body in the periphery of a control target such as an autonomous driving vehicle, the control target can be driven efficiently and safely.

Solution to Problem

In order to solve the above problems, this invention is constituted as follows.

An autonomous control system includes: a state amount acquiring unit that acquires a state amount of a control target; a control target position identification unit that identifies a position of the control target on the basis of the state amount; a control target reaching region calculation unit that calculates a control target reaching region that the control target can reach within a predetermined time on the basis of the position of the control target; an outside information acquiring unit that acquires outside information of the control target; a target distinguishing unit that distinguishes an attribute of a non-control target on the basis of the outside information; a non-control target position identification unit that calculates a position of the non-control target on the basis of the outside information; a non-control target reaching region calculation unit that uses the attribute and the position, to calculate a non-control target region that the non-control target can reach within a predetermined time; an intersection region calculation unit that uses a set of the positions of the control target and the set of the positions of the non-control target calculated by the non-control target reaching region calculation unit, to calculate an intersection region of the sets of the respective positions; a control parameter setting unit that sets a control parameter of the control target such that as an intersection amount region of the intersection region of the sets of the respective positions is larger, a behavior in which the control target widens the distance between the control target and the non-control target is generated; and an operation amount calculation unit that uses the control parameter and an objective function whose value becomes smaller as the control target is closer to the desirable behavior, to calculate a control input such that the value of the objective function becomes a smaller value than the previous value in the range in which a predetermined constraint condition is satisfied.

An autonomous control method includes: acquiring a state amount of a control target; identifying a position of the control target on the basis of the state amount; calculating a control target reaching region that the control target can reach within a predetermined time on the basis of the position of the control target; acquiring outside information of the control target; distinguishing an attribute of a non-control target on the basis of the outside information; calculating a position of the non-control target on the basis of the outside information; using the attribute and the position, calculating a non-control target region that the non-control target can reach within a predetermined time; using a set of the positions of the control target and a set of the positions of the non-control target, calculating an intersection region of the sets of the respective positions; setting a control parameter of the control target such that as an intersection amount region of the intersection region of the sets of the respective positions is larger, a behavior in which the control target widens the distance between the control target and the non-control target is generated; and using the control parameter and an objective function whose value becomes smaller as the control target is closer to the desirable behavior, calculating a control input such that the value of the objective function becomes a smaller value than the previous value in the range in which a predetermined constraint condition is satisfied.

Advantageous Effects of Invention

It is possible to provide an autonomous control system and an autonomous control method in which even when it is difficult to predict a behavior of a non-control target that is a moving body in the periphery of a control target such as an autonomous driving vehicle, the control target can be driven efficiently and safely.

BRIEF DESCRIPTION OF DRAWINGS

FIG. 1 is a function block diagram regarding an autonomous control system according to a first embodiment.

DESCRIPTION OF EMBODIMENTS

Figure 2A:
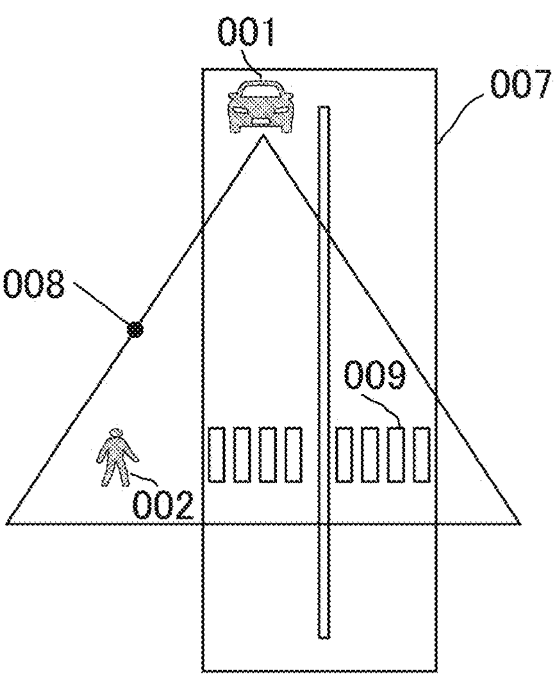
FIG. 2A is a diagram explaining the first embodiment in which the present invention is applied to a vehicle.

An autonomous control system is a system that is mounted on a moving body as a control target, collects peripheral information of the moving body as the control target, and controls movement of the moving body as the control target such that the moving body as the control target does not come into contact with an obstacle including a moving body different from the moving body as the control target. The moving body as the control target means a vehicle, a robot, and the like. The moving body different from the moving body as the control target means a pedestrian, other vehicles, and other robots.

Note that the moving body as the control target is not limited to a fully autonomous driving vehicle, and may be a semi-autonomous driving vehicle that is driven by a driver in the normal state and can intervene only in an emergency.

In addition, for the moving body as the control target, a vehicle traveling on a general public road may be targeted, and a vehicle (forklift) and a robot traveling in a logistics warehouse may be targeted.

Hereinbelow, embodiments of the autonomous control system of the present invention will be described with reference to the drawings.

EMBODIMENT

First Embodiment

FIG. 1 is a function block diagram that simplifies an example of components of an autonomous control system A100 according to a first embodiment of the present invention.

The autonomous control system A100 may include control other than the basic functions illustrated in FIG. 1.

Hereinbelow, an example in which the present invention is applied to situations illustrated in FIGS. 2A and 2B where a vehicle 001 that is a control target traveling on a vehicular road 007 is the control target and a pedestrian 002 walking on a pedestrian road 009 is a non-control target will be considered.

Note that for simplifying the description, the situation where one control target and one non-control target are present is represented, but the present invention can be used even in the case where both of the control target and the non-control target include a plurality of control targets and a plurality of non-control targets.

The autonomous control system A100 receive, as inputs, detection results of an outside information acquiring device A001 that acquires environment information representing a state in the periphery of the vehicle 001 as the control target and a state amount acquiring unit A002 that acquires a state amount that is information representing an inside state of the vehicle 001 as the control target. The state amount of the vehicle 001 as the control target includes a position, an orientation, a speed, and the like.

Note that all the functions of the autonomous control system A100 are not necessarily required to be implemented on the vehicle 001. As illustrated in an example of a hydraulic excavator described later, when an area in which the control target moves is limited, it is also possible to allow a server that can communicate with an inside of the area to have a calculation function.

The outside information acquiring unit A001 is the collective name of sensors that acquire outside information of the moving body as the control target. That is, the outside information acquiring unit A001 means an external environment recognition sensor, such as a LiDAR (Light Detection And Ranging) mounted on the vehicle 001 as the control target, a stereo camera, and a millimeter wave radar.

Figure 2B:
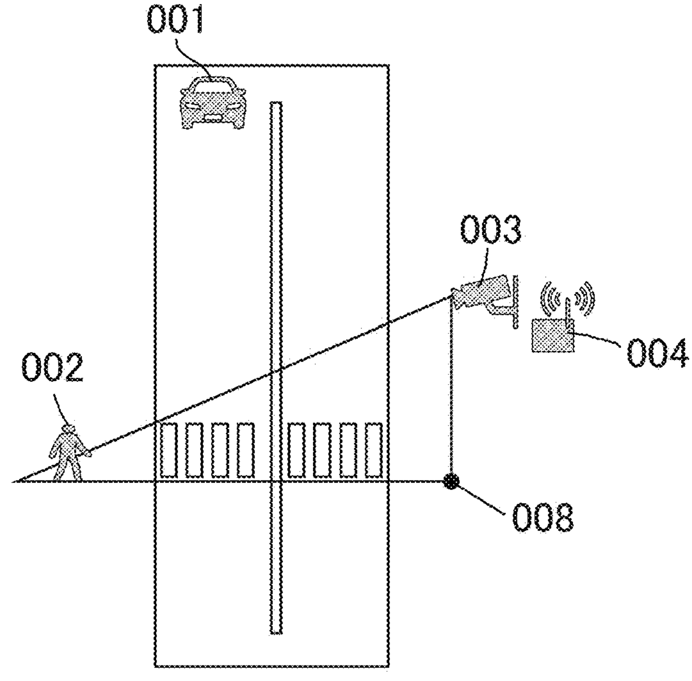
FIG. 2B is a diagram explaining the first embodiment in which the present invention is applied to the vehicle.

In FIG. 2A, the outside information acquiring unit A001 is provided only in the front of the vehicle 001, but a plurality of outside information acquiring units A001 may be installed in the vehicle 001 so as to monitor the side and the rear of the vehicle 001.

In addition, when peripheral information of the vehicle 001 as the control target can be collected, the environment recognition device A001 is not required to be mounted on the own vehicle. For example, as illustrated in FIG. 2B, a recognition sensor (infrastructure sensor) 003 that is installed in a place physically separated from the vehicle 001 as the control target is installed, and when sensor information of the pedestrian 002 acquired by the infrastructure sensor 003 can be provided to the vehicle 001 via a wireless system 004, the infrastructure sensor 003 also corresponds to the outside information acquiring unit A001 of the present invention.

The state amount acquiring unit A002 is the collective name of sensors that acquire a state of the moving body itself as the control target, and acquires the state amount that is inside information of the control target. The state amount is the collective name of information regarding movement of the control target, such as a position, an orientation (direction), a speed, an angular speed, an acceleration speed, and an angular acceleration speed. That is, a GNSS (Global Navigation Satellite System) for acquiring position information of the own vehicle, an IMU (Inertial Measurement Unit) acquiring the acceleration speed and the angular speed of the own vehicle, a vehicle speed sensor, an encoder, and the like correspond to the state amount acquiring unit A002. Further, attention is required in that since the LiDAR mounted on the own vehicle can be utilized also for a SLAM (Simultaneous Localization and Mapping) that is a technique for calculating the position and the orientation of the vehicle, the LiDAR becomes a sensor corresponding also to the state amount acquiring unit A002.

A control target position identification unit A003 calculates the position information of the vehicle 001 as the control target by integrating the respective sensor information acquired by the state amount acquiring unit A002. That is, the control target position identification unit A003 identifies the position of the control target on the basis of the inside information of the control target. For example, in the case of the vehicle 001 on which the LiDAR is mounted, a function of estimating the position of the own vehicle by using the SLAM corresponds to the control target position identification unit A003.

In addition, even in the case of the vehicle 001 including the GNSS that can directly acquire the vehicle position, a sensor fusion function of complementing, by the IMU, an update cycle period of the position information provided by the GNSS is required, and this function corresponds to the control target position identification unit A003.

Note that in the case of the vehicle 001 on which only one in which the sensor mounted on the control target acquires the position information, for example, only the GNSS, is mounted, the GNSS is the state amount acquiring unit A002, and is also the control target position identification unit A003.

In addition, when configured is a system such that there is, on a traveling path, a sensor to which position information is registered and the vehicle 001 passes on the sensor to acquire its own position, this system may be handled as the control target position identification unit A003. Such a system is utilized in control of the autonomous moving body in a limited region such as a logistics warehouse.

A target distinguishing unit A004 distinguishes an attribute of the moving body (non-control target) in the periphery of the vehicle 001 as the control target, by a technique such as image recognition, a Semantic SLAM, and semantic segmentation on the basis of the sensor data (outside information) acquired by the outside information acquiring unit A001. This distinguishing performs classification regarding a characteristic regarding movement, for example, whether the moving body is a pedestrian, a bicycle, or a four-wheeled vehicle.

Note that regarding the stereo camera and the millimeter wave radar, there are also products including a processing function in which these devices themselves distinguish the moving body. In this case, the outside information acquiring unit A001 and the target distinguishing unit A004 are not necessarily required to be particularly divided.

Here, the characteristic regarding movement means a motion equation that dominates dynamic characteristic of the moving body and a maximum value of a moving speed of the moving body. In the case of the pedestrian 002, he/she can freely walk on a two-dimensional plane. On the other hand, for example, the vehicle, such as a wheelchair, a bicycle, a scooter, and an automobile cannot move directly to the side, thereby including a holonomic constraint.

Further, even in the case of the pedestrian, an adult, a child, and an old person have different moving speeds, so that it is desirable to consider a characteristic in which the pedestrian is classified more finely.

Like the target distinguishing unit A004, a non-control target position identification unit A005 calculates a position of the moving body (non-control target target) by the Semantic SLAM technique and the like on the basis of the sensor data (outside information) acquired by the outside information acquiring unit A001.

By precisely acquiring the orientation (direction) and the speed of the moving body, improvement in prediction accuracy of the position of the moving body can be expected. Therefore, for example, it is desirable that, by acquiring position information (the X, Y coordinates on the two-dimensional plane) at a plurality of times, a process for estimating the orientation (direction) and the rotation speed (angular speed) of the moving body, and the moving speed of the moving body is included.

The target distinguishing unit A004 and the non-control target position identification unit A005 can be executed by the same technique at the same time (by parallel processing).

Figure 3:
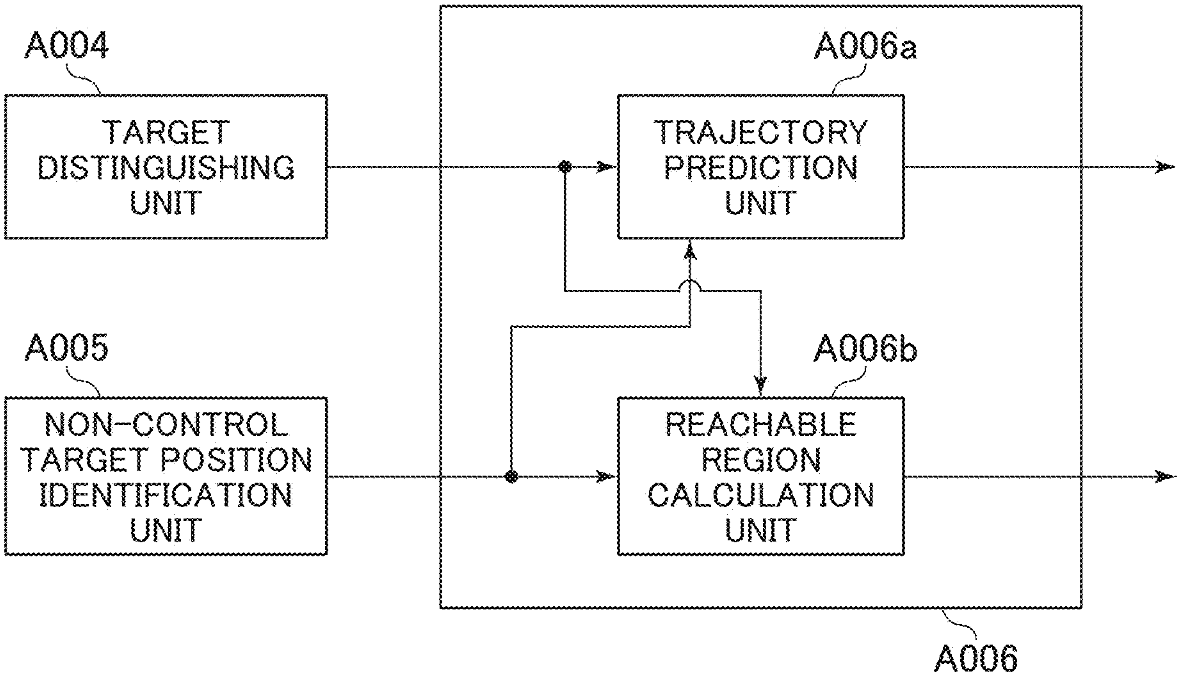
FIG. 3 is a function block diagram of a non-control target reaching region prediction unit.

As illustrated in FIG. 3, a non-control target reaching region calculation unit A006 includes a trajectory prediction unit A006*a*, and a reachable region calculation unit A006*b*, and calculates a non-control target region that the non-control target can reach within a predetermined time. That is, the attribute distinguished by the target distinguishing unit A004 and the position of the non-control target calculated by the non-control target position identification unit A005 are used to calculate the non-control target region that the non-control target can reach within the predetermined time.

The trajectory prediction unit A006*a* predicts a moving trajectory of the non-control target at an arbitrary time ahead on the basis of the moving body characteristic of the non-control target distinguished by the target distinguishing unit A004 and the position, the direction (orientation), and the speed of the non-control target calculated by the non-control target position identification unit A005 before the arbitrary time. Note that the arbitrary time means the product of a sampling cycle Δta and a predictive horizon Na.

Figure 4A:
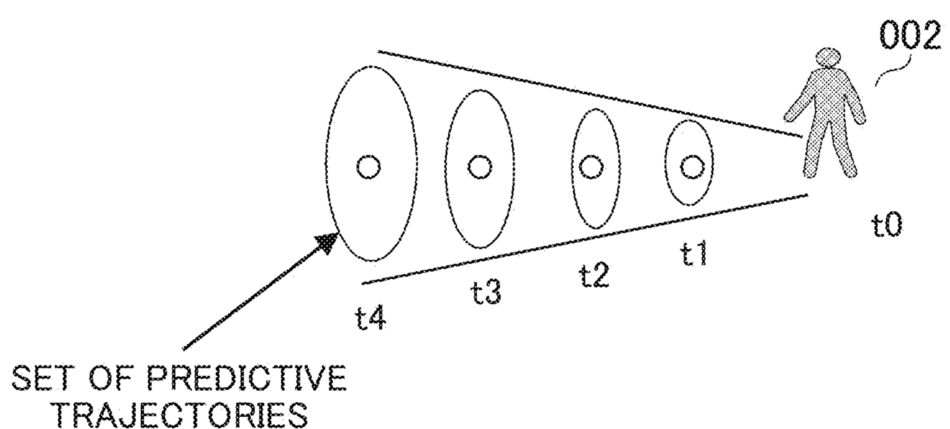
FIG. 4A is a diagram illustrating an example of processing contents of a trajectory prediction unit.
Figure 4B:
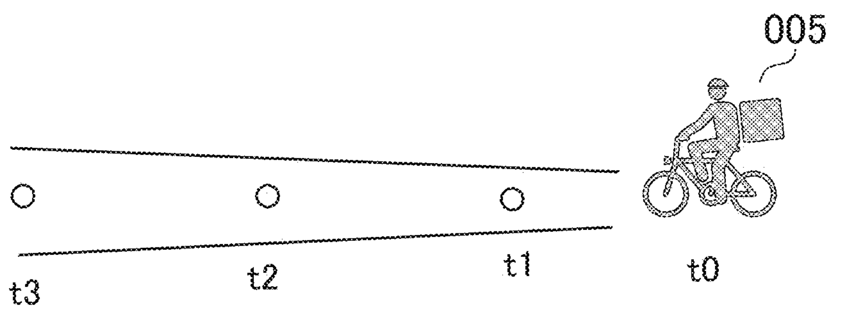
FIG. 4B is a diagram illustrating an example of processing contents of the trajectory prediction unit.

FIGS. 4A and 4B illustrate examples of prediction of moving trajectories by the trajectory prediction unit A006*a*.

FIG. 4A illustrates an example of predictive trajectories of the pedestrian 002 from time t0 to time t4 at 4 steps ahead (Na=4) (t0+Na×Δt). Since the pedestrian 002 can, not only straightly move, but also freely move in the diagonal direction and the horizontal direction, there is a feature in which as time elapses, the candidate range of the trajectory is widened. The trajectory prediction unit A006*a* calculates the trajectory that can be taken, on the basis of the orientation and the speed of the non-control target at the time t0, so that there is a feature in that the pedestrian 002 maintains his/her moving direction, that is, continues to move in the left direction on the sheet surface. Note that since a walking speed and straightness of the pedestrian 002 are varied, the set of predictive trajectories has uncertainty, so that it is desirable to calculate the set of predictive trajectories in the elliptic shape illustrated in FIG. 4A.

FIG. 4B illustrates an example in which similar predictive trajectories are drawn for a bicycle 005. Since the bicycle 005 has difficulty in moving in the left-right direction as compared with the pedestrian 002, the candidate range is not widened in the up-down direction on the sheet surface, but the bicycle 005 has a high moving speed as compared with the pedestrian 002, so that there is a feature in that the candidate range is widened in the left-right direction on the sheet surface.

The predictive trajectories illustrated in FIGS. 4A and 4B can be calculated by prediction based on probability models. That is, an average value and distribution can be acquired. Therefore, as illustrated in FIGS. 4A and 4B, it is desirable to give widening of the candidate range by the distribution.

For example, when the X, Y coordinates of the moving body (the pedestrian 002, the bicycle 005) as the non-control target at the time t0 are $X_0$, $Y_0$, the orientation thereof is $\theta_0$, the angular speed thereof is wo, and the moving speed thereof is $v_0$, the X, Y coordinates of the moving body at the time k can be sequentially calculated by the following equation (1).

[Mathematical 1]

$$\begin{cases} X_k = X_{k-1} + \Delta t \cdot v_{k-1} \cdot \cos\theta_{k-1} + w_X \\ Y_k = Y_{k-1} + \Delta t \cdot v_{k-1} \cdot \sin\theta_{k-1} + w_Y \\ \theta_k = \theta_{k-1} + \Delta t \cdot w_{k-1} + w_\theta \\ v_k = v_{k-1} + w_v \\ \omega_k = \omega_{k-1} + w_\omega \end{cases} \quad (1)$$

Here, the $w_X$, $w_Y$, $w_\theta$, $w_V$, $w_\omega$ are process noises. Note that when like the pedestrian 002, the moving body can freely move on the X, Y plane, a method by which like the following equation (2), the speed $v^X$ in the X direction and the speed $v^Y$ in the Y direction are individually calculated may be used.

[Mathematical 2]

$$\begin{cases} X_k = X_{k-1} + \Delta t \cdot v_{k-1}^X + w_X \\ Y_k = Y_{k-1} + \Delta t \cdot v_{k-1}^X + w_Y \\ v_k^X = v_{k-1}^X + w_{Xv} \\ v_k^Y = v_{k-1}^Y + w_{Yv} \end{cases} \quad (2)$$

The reachable region calculation unit A006*b* calculates the region that the non-control target can reach at the arbitrary time ahead on the basis of the moving body characteristic of the non-control target distinguished by the target distinguishing unit A004 and the position, the orientation, and the speed of the non-control target calculated by the non-control target position identification unit A005 before the arbitrary time.

Figure 5A:
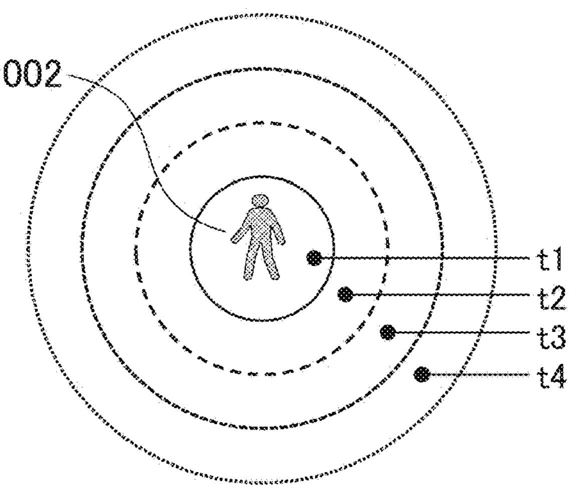
FIG. 5A is a diagram illustrating an example of processing contents of a reachable region calculation unit.
Figure 5B:
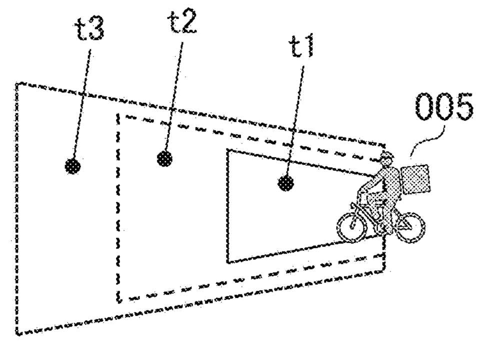
FIG. 5B is a diagram illustrating another example of the processing contents of the reachable region calculation unit.
Figure 5C:
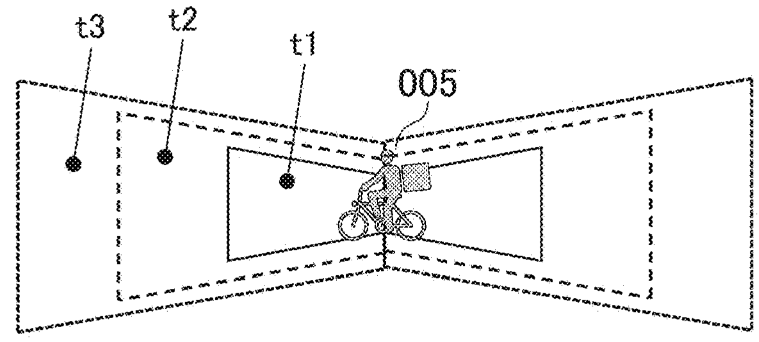
FIG. 5C is a diagram illustrating a still another example of the processing contents of the reachable region calculation unit.

FIGS. 5A, 5B, and 5C illustrate examples of calculation results of the reachable regions.

FIG. 5A illustrates an example of the reachable regions of the pedestrian 002 from the time t0 to the time t4 at 4 steps ahead (Na=4) (t0+Na×αt). Unlike the predictive trajectory calculated by the trajectory prediction unit A006*a*, for the reachable region, the region in which the moving body can move is calculated without depending on the orientation of the moving body at the time t0.

Therefore, the reachable regions of the pedestrian 002 are spread in a circle shape. This is a shape in which the respective values on predictive trajectories t1 to t4 of FIG. 4A are arranged in all directions (on the arc). Note that since the reachable region is a region reachable by each time, attention is required in that the reaching region at the time tk also includes the reaching region at the previous time tk−1. For example, the reaching region at the t2 of FIG. 5A represents the region including the circle of the reaching region at the t1, and does not represent the region of the difference (annular ring) between the circle of the reaching region at the t1 and the circle of the reaching region at the t2.

It is desirable that the moving speed in calculating the reachable region is calculated by using, of the speed of the moving body at the time k and the moving speed set according to the moving body characteristic, the larger value. That is, as expressed by the following equation (3), the reachable region is calculated by using the $v_k$ calculated by sequentially updating the moving speed $v_0$ acquired at the time 0 and the value $v_{pred}$ that takes the maximum value of the $v_{pre}$ decided for each moving characteristic.

[Mathematical 3]

$$\begin{cases} v_k = v_{k-1} + w_v \\ v_{pred} = \max(v_k, v_{pre}) \end{cases} \tag{3}$$

FIG. 5B illustrates an example in which similar reachable regions are drawn for the bicycle 005. Since basically, the bicycle 005 can move only in the front direction, the reachable region also has a limited shape as compared with the reachable region of the pedestrian 002 of FIG. 5A. Note that like FIG. 5C, the reachable region may be extended in the direction in which the bicycle 005 retreats. In addition, like FIG. 5A, it may be assumed that the bicycle 005 moves in all directions.

A control target reaching region calculation unit A007 calculates a control target reaching region that the moving body as the control target can reach within a predetermined time on the basis of the position information of the control target acquired by the control target position identification unit A003. Note that an arbitrary time is set like the non-control target reaching region calculation unit A006.

Figure 6A:
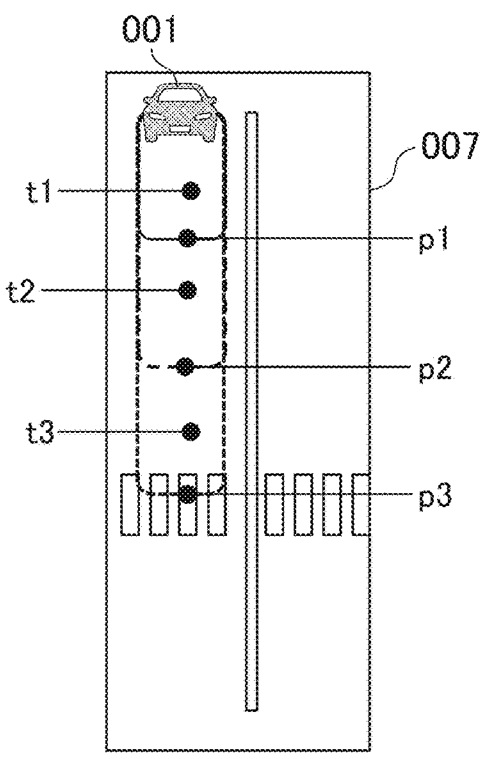
FIG. 6A is a diagram illustrating an example of processing contents of a control target reaching region calculation unit.

This calculation is basically the same as the reachable region calculation unit A006*b* of the non-control target reaching region calculation unit A006. However, attention is required in that since the control target reaching region calculation unit A007 has a function of calculating the moving region of the moving body controlled by the autonomous control system, the uncertainty is less. That is, when like FIG. 6A, the vehicle 001 traveling on the vehicular road 007 is handled, a trajectory in which the vehicle 001 projects from the vehicular road 007 is not required to be considered, and a trajectory in which the vehicle 001 projects to the opposite lane is not required to be considered, either. Likewise, a situation where the vehicle 001 that is an automobile retreats is not required to be evaluated.

Note that as described above, attention is required in that also for the control target reaching region, the reaching region at the time tk includes the reaching region at the previous time tk−1.

It is desirable that the farthest point pk of the reachable region at each time tk (p1, p2, p3 . . . ) is calculated as a point that the vehicle 001 reaches by uniform motion by using, of two of the maximum speed of the vehicle 001 and the maximum speed set to the vehicular road 007 during traveling (legal speed and the like), the lower speed.

Figure 6B:
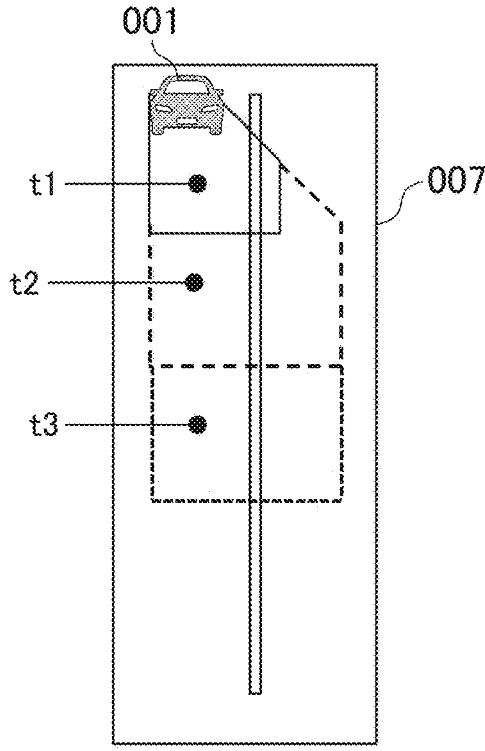
FIG. 6B is a diagram illustrating an example of processing contents of the control target reaching region calculation unit.

Note that like FIG. 6B, in the case of the vehicular road 007 with two vehicular lanes on one side, the reachable region may be set in consideration of movement including lane change.

An intersection region calculation unit A008 uses the moving trajectory and the reachable region of the non-control target calculated by the non-control target reaching region calculation unit A006 and the reachable region of the control target calculated by the control target reaching region calculation unit A007 to calculate an intersection region of the vehicle 001 as the control target and the pedestrian 002 as the non-control target. That is, the intersection region calculation unit A008 uses the set of the positions of the control target calculated by the control target reaching region calculation unit A007 and the set of the positions of the non-control target calculated by the non-control target position identification unit A005 to calculate an intersection region of the sets of the respective positions.

The specific processing contents of the intersection region calculation unit A008 will be described in detail with reference to FIGS. 7A to 7E. Note that attention is required in that unlike FIGS. 2A and 2B, FIGS. 7A to 7E omit the vehicular road and the pedestrian crossing in order to prioritize the visibility of the drawings.

Figure 7A:
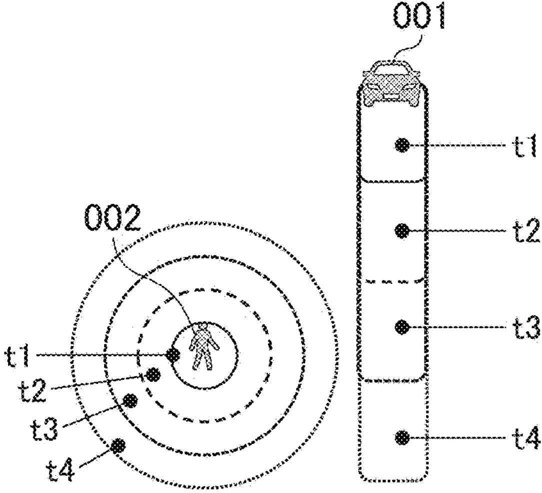
FIG. 7A is a diagram explaining processing contents of an intersection region calculation unit.

FIG. 7A is a diagram illustrating, as an example, the relationship between the reachable regions of the control target and the non-control target until a 4th time step ahead (t4). In FIG. 7A, the control target is the vehicle 001, and the non-control target is the pedestrian. Note that the present invention is not limited to the execution of the evaluation until the 4th time step ahead.

In FIG. 7A, the reachable regions of the vehicle 001 and the pedestrian 002 do not intersect with each other at all. That is, no matter how the pedestrian 002 moves, the vehicle 001 does not come into contact with the pedestrian 002 until the 4th time step.

Figure 7B:
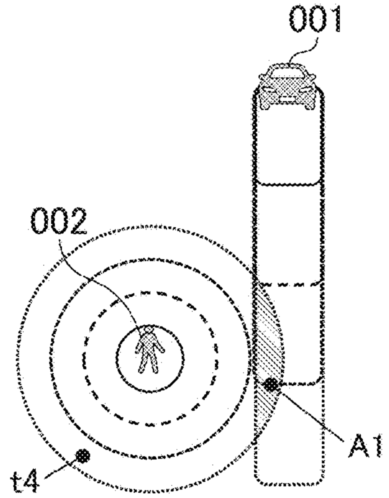
FIG. 7B is a diagram explaining processing contents of the intersection region calculation unit.

FIG. 7B illustrates a situation where the position of the pedestrian 002 at the time t0 is different from FIG. 7A. In this situation, the reaching range of the pedestrian 002 at the time t4 intersects with the reaching range of the vehicle 001 (in the drawing, A1). That is, in the situation of FIG. 7B, at the 4th time step, the vehicle 001 and the pedestrian 002 can come into contact with each other. Note that in the present invention, the A1 region in the drawing will be called a first intersection region.

Figure 7C:
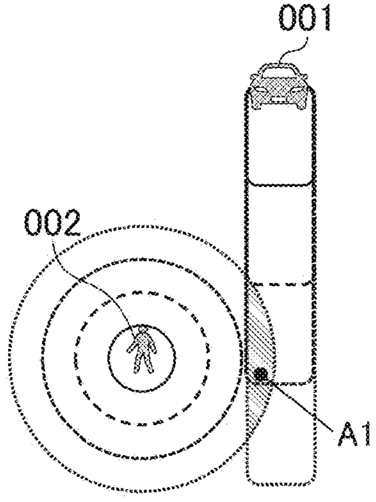
FIG. 7C is a diagram explaining processing contents of the intersection region calculation unit.

FIG. 7C illustrates the case where although the position of the pedestrian 002 at the time t0 is the same as FIG. 7B, the orientation of the pedestrian 002 is different. Since the reachable region of the non-control target calculated by the non-control target reaching region calculation unit A006 does not depend on the orientation of the non-control target (pedestrian 002), the reaching range of the pedestrian 002 at the time t4 intersects, like FIG. 7B, the reaching range of the vehicle 001 (in the drawing, the first intersection region A1).

In the situation where it is impossible to predict how the pedestrian 002 moves, in any of the situations of FIGS. 7B and 7C, the possibility in which the vehicle 001 and the pedestrian 002 come into contact with each other cannot be denied. However, with typical consideration, a situation where the pedestrian 002 suddenly changes his/her moving direction is unlikely to be considered. To consider such a situation, the intersection region calculation unit A008 also calculates together a second intersection region A2 whose calculation method is different from the first intersection region A1.

Figure 7D:
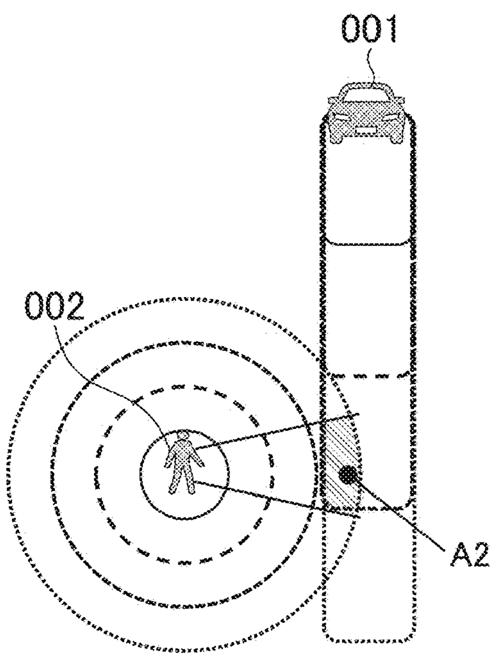
FIG. 7D is a diagram explaining processing contents of the intersection region calculation unit.

FIG. 7D illustrates the calculation example of the second intersection region A2 in the same situation as FIG. 7B. The second intersection region A2 is the region in which the moving trajectory of the non-control target calculated by the non-control target reaching region calculation unit A006 and the reachable region of the control target calculated by the control target reaching region calculation unit A007 intersect with each other.

Figure 7E:
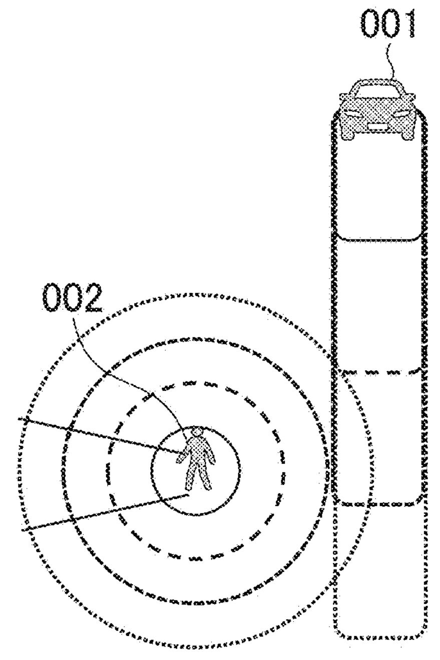
FIG. 7E is a diagram explaining processing contents of the intersection region calculation unit.

FIG. 7E illustrates the calculation example of the second intersection region A2 in the same situation as FIG. 7C. Since the orientation of the pedestrian 002 is considered, the moving trajectory of the non-control target calculated by the non-control target reaching region calculation unit A006 does not intersect with the reachable region of the control target calculated by the control target reaching region calculation unit A007.

In this way, according to the presence or absence of the second intersection region A2, the collision possibility of the vehicle 001 and the pedestrian 002 is evaluated.

A control parameter setting unit A009 sets a control parameter of the control target used by an operation amount calculation unit A010 described later according to the calculation result of the intersection region calculation unit A008. That is, the control parameter setting unit A009 sets the control parameter to be large such that as the intersection amount region of the intersection region calculated by the intersection region calculation unit A008 is larger, a behavior in which the control target widens the distance between the control target and the non-control target is generated.

Figure 8A:
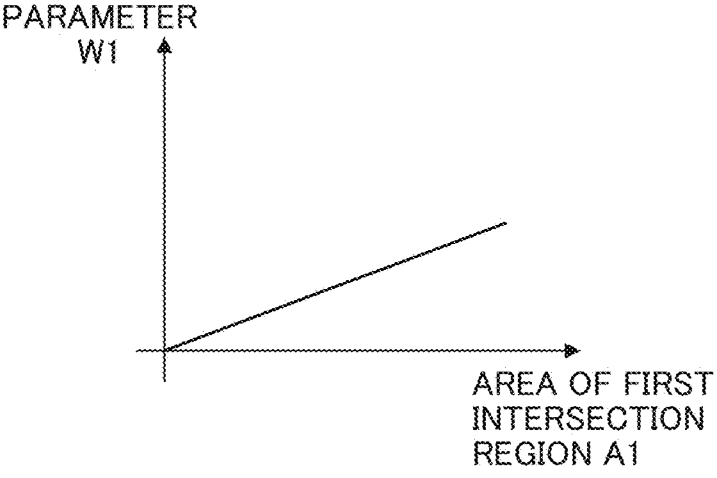
FIG. 8A is a diagram explaining processing contents of a control parameter setting unit.
Figure 8B:
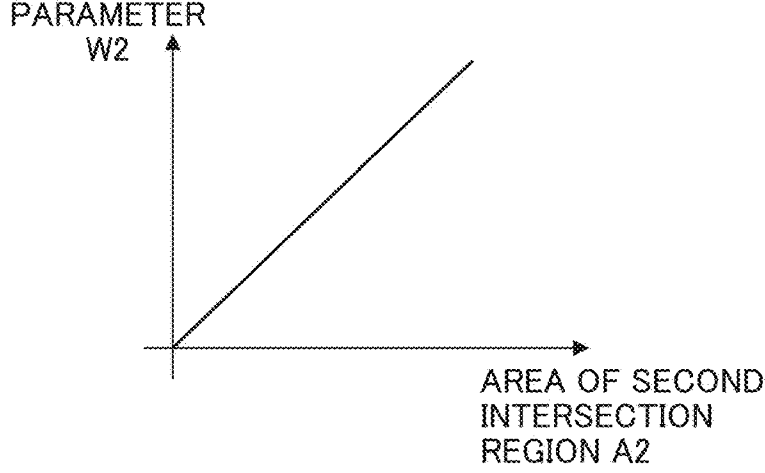
FIG. 8B is a diagram explaining processing contents of the control parameter setting unit.

It is desirable that for the control parameter of the control target, for example, like FIGS. 8A and 8B, as the respective areas of the first intersection region A1 and the second intersection region A2 calculated by the intersection region calculation unit A008 are larger, the values of the control parameters W1, W2 are increased. As respectively illustrated in FIGS. 8A and 8B, with respect to the first intersection region A1 and the second intersection region A2, the different parameters W1, W2 may be set, and the same parameter W may be set.

Figure 8C:
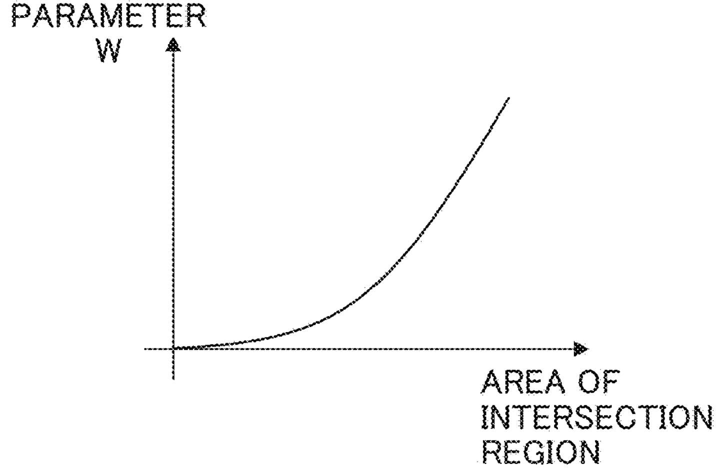
FIG. 8C is a diagram explaining processing contents of the control parameter setting unit.

Further, as illustrated in FIG. 8C, the area of the intersection region and the magnitude of the parameter W may be defined by a non-linear relationship. The detail of a method of using the control parameter will be described later.

Note that the control parameters W1, W2 can also be defined as a plurality of parameters having different meanings according to the control calculation executed by the operation amount calculation unit A010 described later. In such a case, it is desirable to include a relational expression that expresses the parameter and the area of the intersection region illustrated in each of FIG. 8A to 8C, or a plurality of tables.

The operation amount calculation unit A010 uses the position of the control target calculated by the control target position identification unit A003, the position of the non-control target calculated by the non-control target position identification unit A005, the predictive trajectories of the non-control target calculated by the non-control target reaching region calculation unit A006 (the set of the trajectories through which the non-control target passes within the predetermined time), and the control parameter set by the control parameter setting unit A009, to thereby calculate an actuator instruction value for controlling the behavior of the control target.

For example, when the control target is the vehicle 001, calculation regarding an accelerator instruction and a brake instruction for controlling the acceleration and deceleration of the vehicle 001 and a steering instruction for controlling the direction of the vehicle 001 is executed by the operation amount calculation unit A010.

It is desirable that since the autonomous control system A100 of the present invention performs control on the basis of the future behaviors of the control target and the non-control target, the operation amount calculation unit A010 is achieved by using model predictive control (Model Predictive Control; hereinafter, an MPC). The operation amount calculation unit A010 uses the control parameter decided by the control parameter setting unit A009 and an objective function J whose value becomes smaller as the control target is closer to the desirable behavior, to thereby calculate a control input such that the value of the objective function J becomes a smaller value than the previous value in the range in which a predetermined constraint condition is satisfied.

Hereinbelow, by taking, as an example, the case of controlling the autonomous driving vehicle by using the MPC, the specific calculation contents of the operation amount calculation unit A010 will be described.

Figure 9:
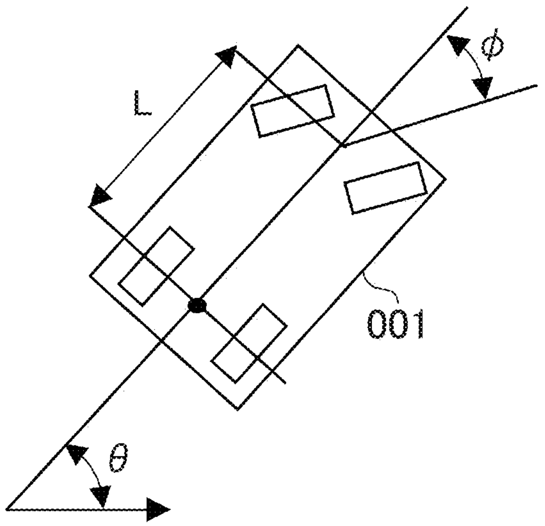
FIG. 9 is a diagram explaining a parameter of the vehicle as a control target.

When the vehicle 001 as the control target is a four-wheeled vehicle illustrated in FIG. 9, considering the vector x=[X Y θ] obtained by arranging the coordinates (X, Y) and the orientation θ of the vehicle 001, simple dynamics can be given by the following equations (4a), (4b).

[Mathematical 4]

$$\frac{dx}{dt} = \frac{d}{dt}\begin{bmatrix} X \\ Y \\ \theta \end{bmatrix} = \begin{bmatrix} v\cos\theta \\ v\sin\theta \\ \frac{v}{L}\tan\phi \end{bmatrix} = f(x, u) \tag{4a}$$

$$u = [v\ \phi]^T \tag{4b}$$

Note that the control input u in the equations (4a) and (4b) is the vehicle speed v and the steering angle φ. In addition, attention is required in that the small letter x represents the state amount, and the capital letter X represents the X coordinate of the vehicle 001.

The differential equation of the equation (4a) can be discretized like the following equation (5) by using the sampling cycle Δt.

[Mathematical 5]

$$x_{k+1} = x_k + \Delta t \cdot f(x_k, u_k) \tag{5}$$

On the other hand, the simple dynamics of the non-control target can be given by the equation (1) or the equation (2).

Note that in the non-control target reaching region calculation unit A006, the control target reaching region calculation unit A007, and the operation amount calculation unit A010, the sampling cycle Δt is not necessarily required to use the same value. For example, by using the sampling cycle of the control target reaching region calculation unit A007 or the non-control target reaching region calculation unit A006 as Δta=100 ms, the sampling cycle of the operation amount calculation unit A010 may be Δt=10 ms.

To automatically control the control target vehicle by using the MPC, the desirable movement is required to be represented by the objective function.

First, the desirable movement of the vehicle 001 as the control target is given in such a manner that the position and the orientation of the vehicle 001 follow the target trajectory r=[xr yr θr]T (T means transpose). When this movement is expressed by the objective function, the following equation (6) is given.

[Mathematical 6]

$$J_1 = (x_N - r_N)^T S(x_N - r_N) + \sum_{k=k_0}^{N+k_0-1} (x_k - r_k)^T Q(x_k - r_k) \tag{6}$$

The N in the equation (6) means the predictive horizon, the S and the Q mean weights, and the objective function $J_1$ means the weighted sum of the target trajectory r and the vehicle position p from the time $k_0$ until the N steps ahead. Note that the predictive horizon N and the predictive horizons of the control target reaching region calculation unit A007 and the non-control target reaching region calculation unit A006 are not necessarily required to match. However, it is desirable that the product of the prediction time calculated by the operation amount calculation unit A010, that is, the sampling cycle Δt and the predictive horizon N becomes smaller than the product of the sampling cycle Δta and the predictive horizon Na of the control target reaching region calculation unit A007 and the non-control target reaching region calculation unit A006.

That is, it can be said that it is desirable that in the calculation of the model predictive control, the operation amount calculation unit A010 does not calculate a trajectory such as to deviate from the reachable region.

The vehicle position at each time k can be predicted by using the equation (5). In addition, for the target trajectory pr, for example, in the case of the vehicle 001 traveling on the general public road, the target trajectory should be provided at the center of the vehicular road 007 several meters ahead from the present vehicle position.

In addition, in view of operating the vehicle 001 as the control target, when the control input (the acceleration and deceleration and the steering amount) is less, the energy consumption amount becomes less, so that it is desirable that like the following equation (7), the objective function including the control input u is added.

[Mathematical 7]

$$J_2 = \sum_{k=k_0}^{N+k_0-1} u_k^T R u_k \tag{7}$$

The R in the equation (7) denotes a weight.

Here, the vector q includes the position information of the non-control target (pedestrian 002) predicted by using the equation (1) or the equation (2). In addition, like FIG. 10, a circle having the radius rp surrounding the vehicle 001 as the control target and a circle having the radius rq surrounding the pedestrian 002 as the non-control target will be considered. In this situation, the distance rk between the vehicle 001 and the pedestrian 002 can be expressed by the following equation (8a).

[Mathematical 8]

$$r_k = \sqrt{(p_k - q_k)^T (p_k - q_k)} \quad p_k = [X_k \ \ Y_k]^T \tag{8a}$$

$$r_k - (r_p + r_q) > 0 \tag{8b}$$

$$u_{lb} \le u_k \le u_{ub} \tag{8c}$$

$$x_{lb} \le x_k \le x_{ub} \tag{8d}$$

Note that the pk is a vector representing the position (Xk, Yk) of the vehicle 001 as the control target at the time k. Under the above preparation, a condition for preventing the vehicle 001 and the pedestrian 002 from coming into contact with each other can be given by the equation (8b).

When the speed v and the steering φ corresponding to the control input regarding the vehicle 001 as the control target are limited, the equation (8c) may be considered as a limiting condition regarding the control input. Here, the $u_{1b}$ means the lower limit value of the input, and the $u_{ub}$ means the upper limit value of the input. Note that when, not only the speed, but also the acceleration, is limited, in consideration of the following equation (9) in which the speed is also added to the state amount, with respect to the equation (4), the limiting condition equation (8c) of the control input and the limiting condition equation (8d) regarding the state amount should be considered at the same time.

[Mathematical 9]

$$\frac{dx}{dt} = \frac{d}{dt}\begin{bmatrix} X \\ Y \\ \theta \\ v \end{bmatrix} = \begin{bmatrix} v\cos\theta \\ v\sin\theta \\ \frac{v}{L}\tan\phi \\ a \end{bmatrix} \tag{9}$$

In the equation (8d), the $x_{1b}$ is the lower limit value of the state amount, and the $x_{ub}$ is the upper limit value of the state amount. Note that in the equation (8d), the lower limit value and the upper limit value are not required to be considered regarding all the state amounts. For example, in the case of the moving body moving in a free space, the X, Y coordinates are not required to be limited.

Under the above preparation, in the model predictive control, the control input u is calculated so as to solve the optimization problem of the following equation (10). The optimization problem of the equation (10) includes the constraint condition of the equation (8b), so that when the behavior of the pedestrian 002 as the non-control target follows the predictive model equation (1) or equation (2), movement in which the vehicle 001 does not come into contact with the pedestrian 002 can be generated.

[Mathematical 10]

$$\min_U J \begin{cases} J = J_1 + J_2 \\ r_k - (r_p + r_q) > 0 \\ u_{lb} \le u_k \le u_{ub} \\ x_{lb} \le x_k \le x_{ub} \end{cases}$$

However, as described above, there is no guarantee that the pedestrian 002 moves as in the predictive model. In such a case, even when the control considering the constraint condition of the equation (8b) is performed, there is no guarantee that the movement in which the vehicle 001 does not come into contact with the pedestrian 002 can be achieved.

Accordingly, in the present invention, the objective function $J_3$ equation (11a) that has lower evaluation as the predictive positions of the pedestrian 002 and the vehicle 001 are closer to each other, that is, the rk of the equation (8a) becomes smaller will be considered. The W of the equation (11a) is a weight parameter, the ε of the equation (11b) is a small constant for preventing division by zero, and the a of the equation (11b) is a coefficient adjusting the shape of the function. The objective function used in the operation amount calculation unit A010 includes the product of a penalty function whose value becomes larger as the distance between the control target and the non-control target is smaller and the control parameter decided by the control parameter setting unit A009.

[Mathematical 11]

$$J_3 = W \sum_{k=k_0}^{N+k_0} l(p_k, q_k) \tag{11a}$$

$$l(p_k, q_k) = \frac{1}{a\{r_k - (r_q + r_p)\}^2 + \varepsilon} \tag{11b}$$

The $l(p_k, q_k)$ of the equation (11b) is a function that gives a penalty with respect to the relationship between the position $p_k$ of the vehicle 001 and the position $q_k$ of the pedestrian 002 at the time k (both are the actual measurement positions at time $k=k_0$, and are the predictive positions at $k=k_0+1$ and thereafter).

Figure 11:
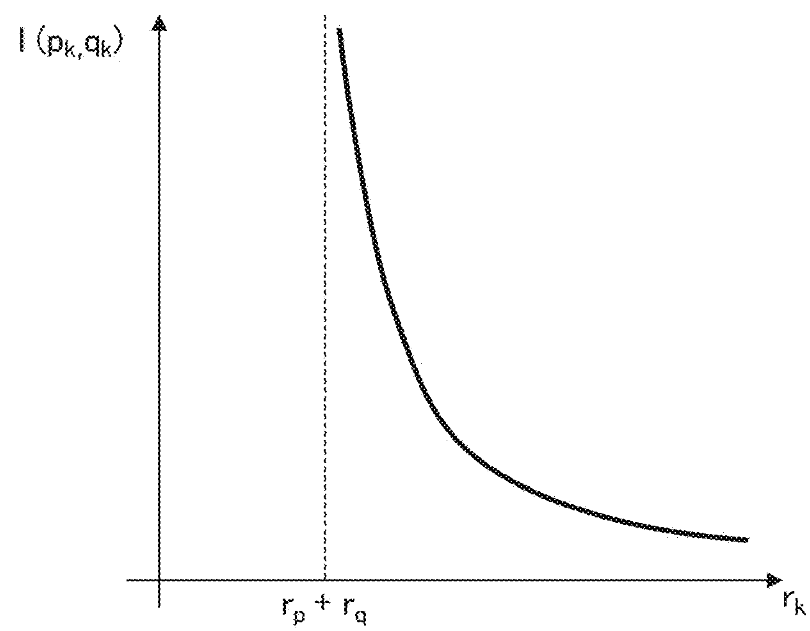
FIG. 11 illustrates an example of a penalty regarding positions of the vehicle and the pedestrian.

FIG. 11 illustrates an example illustrating the shape of the function 1 $(p_k, q_k)$ of the equation (11b). Since the shape of the function is changed according to the c and the a, attention is required in that the shape illustrated in FIG. 11 is only an example. As illustrated in FIG. 11, the function $l(p_k, q_k)$ of the equation (11b) has a feature that as the distance between the vehicle 001 and the pedestrian 002 is larger, that is, the $r_k$ is larger, the penalty becomes smaller, and on the contrary, as the distance between the vehicle 001 and the pedestrian 002 is smaller, that is, the $r_k$ is smaller, the penalty becomes larger.

To reduce the value of the objective function J by using the objective function equation (12) to which the penalty $J_3$ is added, the need to widen the distance between the vehicle and the pedestrian arises, so that safer movement can be generated.

[Mathematical 12]

$$\min_U J \begin{cases} J = J_1 + J_2 + J_3 \\ r_k - (r_p + r_q) > 0 \\ u_{lb} \le u_k \le u_{ub} \\ x_{lb} \le x_k \le x_{ub} \end{cases}$$

Figure 12:
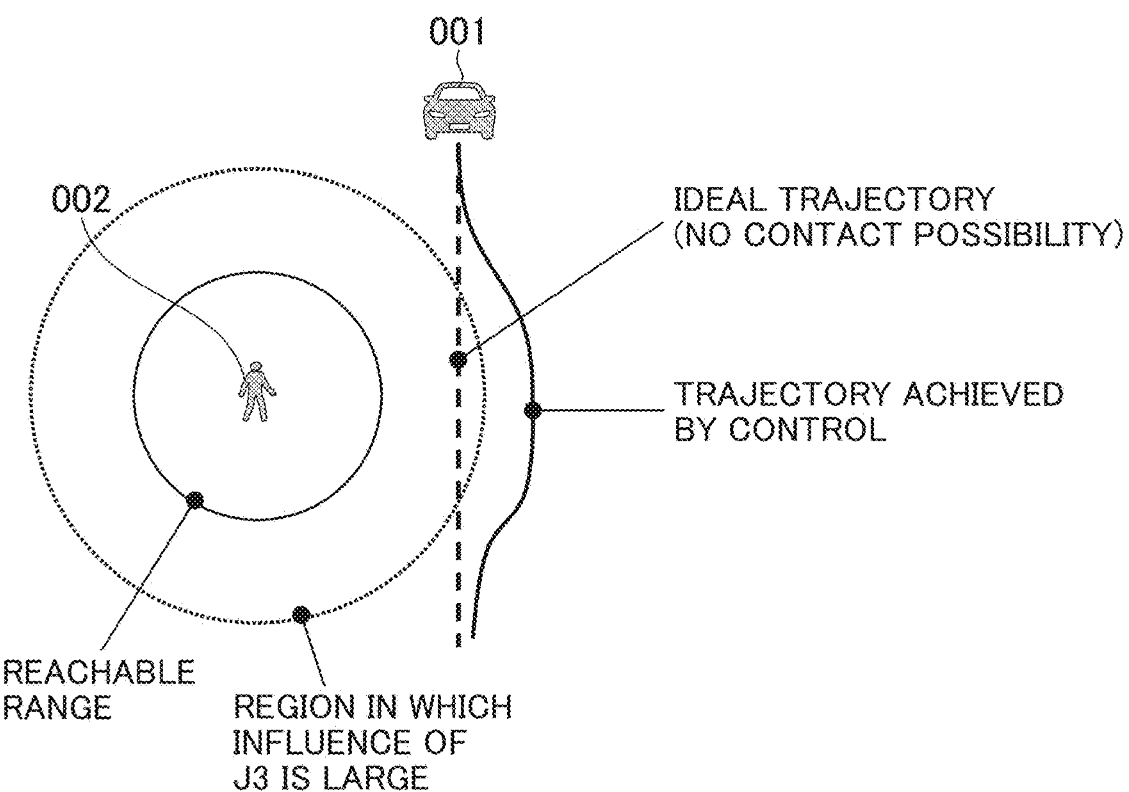
FIG. 12 is a diagram explaining a situation where the vehicle takes unnecessary avoiding movement.

On the other hand, when the influence of the penalty $J_3$ is larger than other the objective functions $J_1$ and $J_2$, the vehicle 001 may perform the unnecessary avoiding movement. For example, as illustrated in FIG. 12, when the influence of the penalty $J_3$ is large as compared with the range that the pedestrian 002 can reach after the arbitrary time, the vehicle 001 takes the unnecessary avoiding movement. Such unnecessary avoiding movement can be solved by tuning the weight parameter W of the equation (11a). In particular, when W=0, $J_3=0$ is always given, so that the optimization problems of the equation (10) and the equation (12) match, and thus, unless the constraint condition equation (8b) is mentioned, the vehicle 001 does not take the avoiding movement. To achieve such movement, like FIGS. 8A to 8C, it is desirable that the weight parameter W is variable according to the area of the intersection region.

In the case where the first intersection region A1 is absent (the area is 0), even when the pedestrian 002 takes any movement, he/she cannot come into contact with the vehicle 001, and there is no need for the vehicle 001 to take the avoiding movement, so that the weight parameter W1 is 0. Therefore, as illustrated in FIGS. 8A to 8C, the relational expression of the area of the intersection region and the weight parameter W has a feature in passing the origin point. However, as described above, the relational expression of the area of the intersection region and the weight parameter W is not necessarily required to be a linear function. For example, the relational expression of the area of the intersection region and the weight parameter W may be a non-linear function, and a particular value may be defined as the upper limit value.

When the second intersection region A is present (the area is not 0), the possibility in which the vehicle 001 comes into contact with the pedestrian 002 is high, so that it is desirable to take safer movement. That is, it is desirable to further increase the weight parameter W. Therefore, it is desirable that as illustrated in FIG. 8B, the weight parameter W2 is set to take a large value according to the area of the second intersection region A2.

It is possible to achieve the desirable safe movement by using the equation (13) using the penalty $J_3$ using the parameters W1, W2 calculated in the above processing.

[Mathematical 13]

$$\min_U J \begin{cases} J = J_1 + J_2 + J_3(W_1, W_2) \\ r_k - (r_p + r_q) > 0 \\ u_{lb} \le u_k \le u_{ub} \\ x_{lb} \le x_k \le x_{ub} \end{cases}$$

Figure 13A:
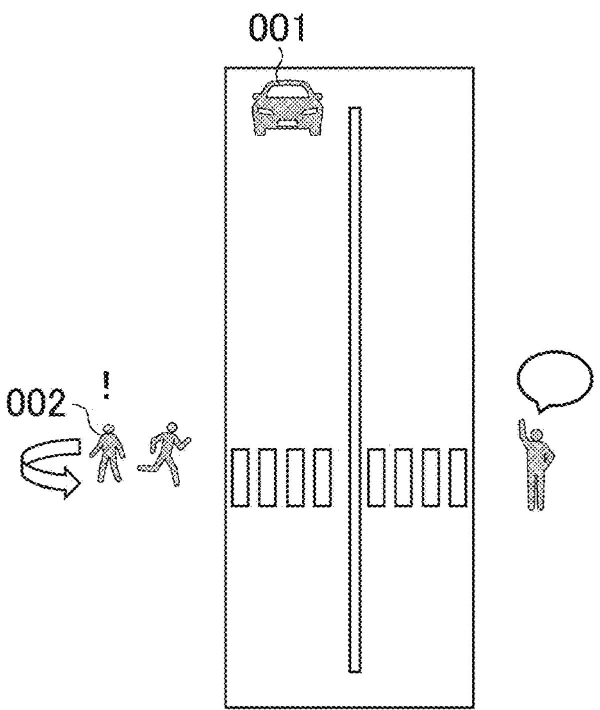
FIG. 13A is a diagram explaining a difference in characteristic of the pedestrian and a parameter setting method using the same.

Note that in the situation illustrated in FIG. 7C, unless the pedestrian 002 changes his/her advancing direction, the possibility in which the vehicle 001 and the pedestrian 002 come into contact with each other is not high. As an example of the situation where the pedestrian 002 suddenly changes his/her advancing direction, as illustrated in FIG. 13A, the case where the child as the pedestrian 002 is called out from his/her friend and starts running in the direction of the voice of his/her friend that the child hears can be considered. On the other hand, since the old person typically has low quickness, the possibility in which such a situation occurs is low.

Figure 13B:
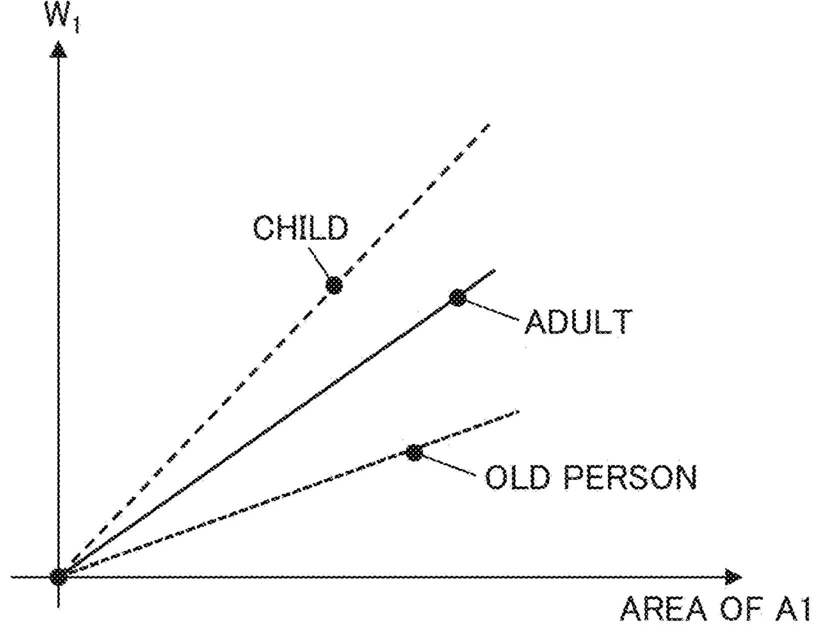
FIG. 13B is a diagram explaining a difference in characteristic of the pedestrian and the parameter setting method using the same.

In this way, the characteristic is greatly different even among the pedestrians 002, so that when the pedestrians 002 can be classified by the target distinguishing unit A004, it is desirable that as illustrated in FIG. 13B, the weight parameter W different for each of the classifications (the child, the adult, and the old person) can be set. That is, the information distinguished by the target distinguishing unit A004 includes, in addition to the moving method of the non-control target, the movement characteristic regarding the safe movement that can be taken by the non-control target, and the control parameter setting unit A009 sets the control parameter to be large such that even when the values of the set of the intersection region calculated by the intersection region calculation unit A008 are the same, as the non-control target has the movement characteristic in which the non-control target is less likely to take the safe movement, a behavior in which the distance between the control target and the non-control target is widened is generated.

In the description heretofore, the region in which the non-control target reaching region and the control target reaching region intersect with each other is simply evaluated, and the weight parameter W is changed according to the area of the intersection region. When such a process is performed, the possibility in which the vehicle 001 takes excessive avoiding movement remains.

Figure 14A:
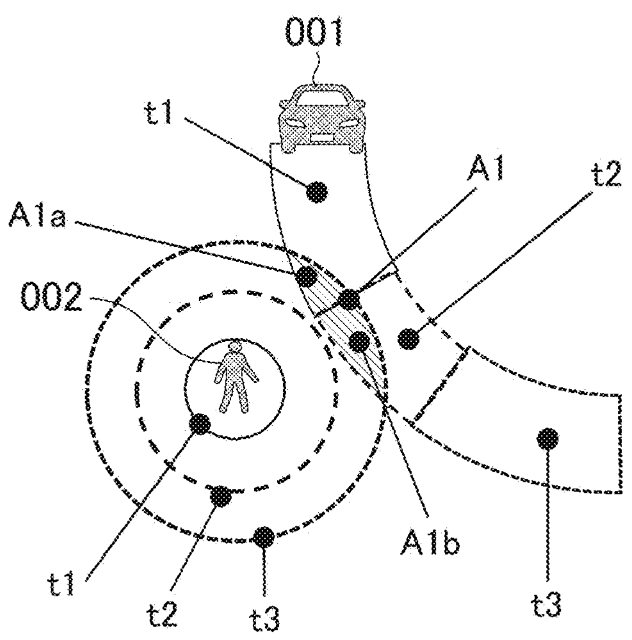
FIG. 14A is a diagram explaining contrivance regarding the parameter setting method.

For example, like FIG. 14A, a situation where the vehicle 001 is traveling to be curved will be considered. To simplify the situation, a region that both of the vehicle 001 and the pedestrian 002 reach by 3 steps ahead (t3) is illustrated.

In FIG. 14A, the region that the pedestrian 002 can reach by the time t3 and the region that the vehicle 001 can reach by the time t1 intersect with each other at the Ala, and likewise, the region that the pedestrian 002 can reach by the time t3 and the region that the vehicle 001 can reach by the time t2 intersect with each other at the Alb. However, the region that the pedestrian 002 can reach at the times t1, t2 and the region that the vehicle 001 can reach at the time t1 do not intersect with each other.

Therefore, unless the vehicle 001 travels at low speed, the vehicle 001 does not come into contact with the pedestrian 002 in the region of the Ala. Likewise, since the region that the pedestrian 002 can reach at the time t2 and the region that the vehicle 001 can reach at the time t2 do not intersect with each other, unless the vehicle 001 travels at low speed, the vehicle 001 does not come into contact with the pedestrian 002 also in the region of the Alb.

Figure 14B:
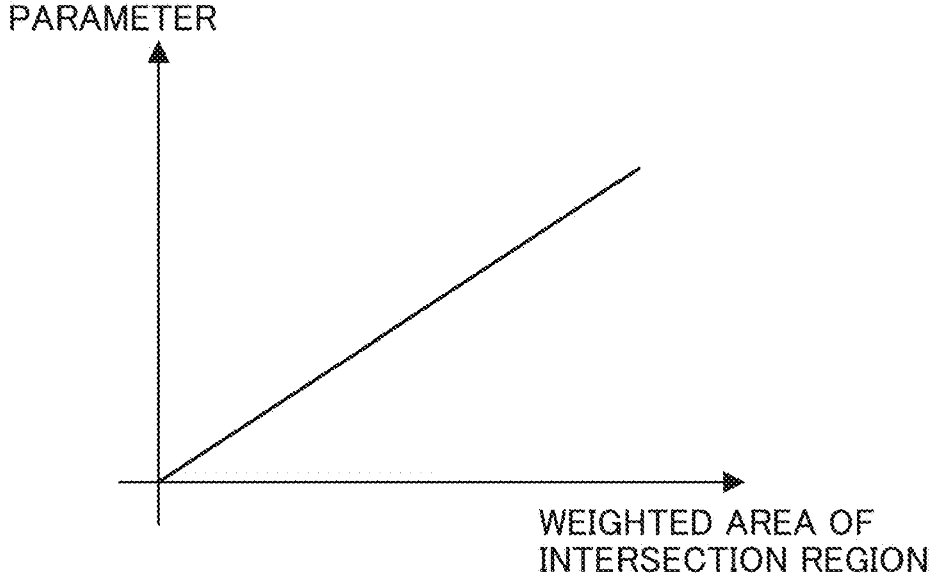
FIG. 14B is a diagram explaining contrivance regarding the parameter setting method.

That is, in the situation of FIG. 14A, as long as the vehicle 001 travels at normal speed, it can be said that the vehicle 001 is not required to take the movement such as to avoid the pedestrian 002. To appropriately handle such a situation, it is desirable to use a weighted area obtained by summing values obtained by multiplying the areas Aia, Aib, . . . of the respective intersection regions (where i=1, 2, and which means the first intersection region A1 and the second intersection region A2) by the weight parameters ai, bi, . . . , like FIG. 14B, without simply deciding the weight parameter W according to the area of the intersection region, like FIGS. 8A to 8C.

Then, it is desirable that the weight parameters ai, bi, . . . are set to be large values when reaching regions at the same time intersect. Further, like the situation illustrated in FIG. 14A, when the reaching region of the control target at the certain time tk and the reaching region of the non-control target at the time tk+x(x≥1) advanced from the time tk intersect with each other, it is desirable that the weight parameters ai, bi, . . . are set to be small values. Further, it is desirable that as the x becomes larger, the weight parameters ai, bi, . . . are made smaller.

Note that when the x exceeds the predetermined value, the weight parameters ai, bi, . . . may be 0.

That is, with the situation like FIG. 14A, by using x=1 as the predetermined value, a1=0, a2=0 are given, so that the weighted area A1*w* is 0, and the control parameter W=0 is set, thereby enabling to eliminate the unnecessary avoiding movement.

Figure 15:
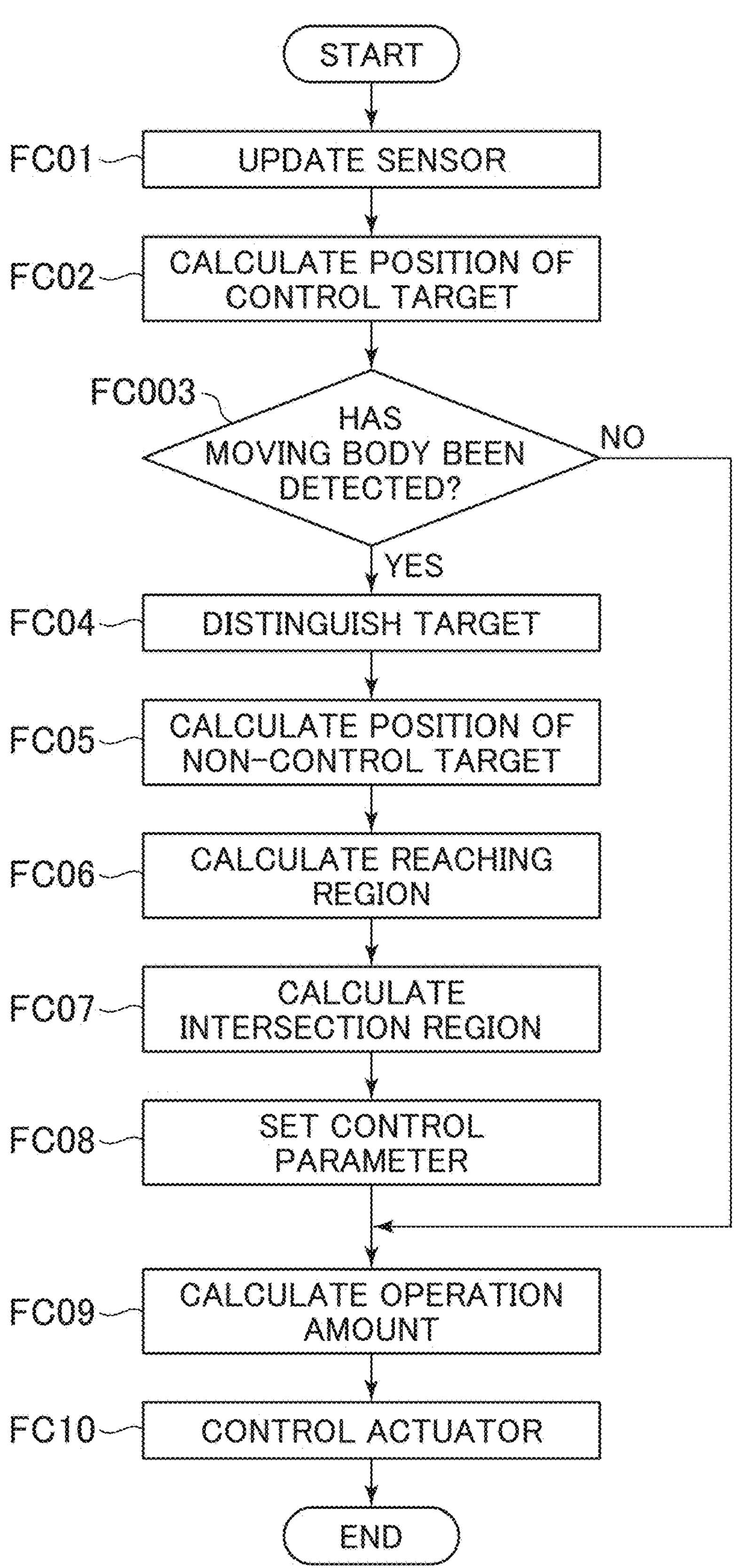
FIG. 15 illustrates an example of a flowchart of the autonomous control system of the present invention.

The processing contents of the autonomous control system A100 is illustrated in the flowchart of FIG. 15.

In the process FC01 of FIG. 15, the detection values of various sensors (the outside information acquiring unit A001, the state amount acquiring unit A002) are updated.

Next, in the process FC02, the present position of the control target is calculated. This process is performed by the control target position identification unit A003.

Next, in the process FC03, it is confirmed whether the outside information acquiring unit A001 has detected the moving body (non-control target). When the moving body has been detected (YES), the flow shifts to the process FC04. On the other hand, when in the process FC03, the moving body has not been detected (NO), the flow shifts to the process FC09. In this case, the control target vehicle performs the control movement considering only the own vehicle 001. That is, the model predictive control is handled so as to minimize the equation (13) without considering the constraint condition regarding the contact with the moving body. Note that the W1 and the W2 in this condition become 0.

In the process FC04, the non-control target is distinguished from the data acquired by the outside information acquiring unit A001. Then, according to this distinguishing result, the moving speed limit (the $v_{pre}$ of the equation (3)) of the non-control target and the size (radius $r_q$) of the non-control target are decided. This process corresponds to the target distinguishing unit A004.

In the process FC05, the present position of the non-control target is calculated. This process is executed by the non-control target position identification unit A005.

In the process FC06, the region that each of the control target and the non-control target can reach from the present position within the predetermined time is calculated. Each of these processes is executed by each of the control target reaching region calculation unit A007 and the non-control target reaching region calculation unit A006. In addition, for the non-control target, the trajectory prediction by the predetermined time ahead is also performed simultaneously according to the characteristic of the target model distinguished in the process FC03 (the pedestrian (the child, the adult, the old person), the bicycle, the motorcycle, and the like). The process of this trajectory prediction is executed by the trajectory prediction unit A006*a* of the non-control target reaching region calculation unit A006.

In the process FC07, performed are the calculation of the first intersection region in which the reaching region of the control target and the reaching region of the non-control target intersect with each other and the calculation of the second intersection region A2 in which the reaching region of the control target and the trajectory prediction range of the non-control target intersect with each other.

In the process FC08, the area of the first intersection region A1 and the area of the second intersection region A2 are used to decide the parameter W used by the objective function $J_3$ of the equation (11b).

In the process FC09, the model predictive control expressed by the equation (13) so as to minimize the decided objective function J is used, to calculate the control input u of the control target vehicle. This process is executed by the operation amount calculation unit A010.

In the process FC10, the control of each actuator is performed so as to achieve the control input u calculated by the process FC09. This process is executed by an actuator A011.

Until here, to achieve the safe traveling, the control method using the penalty function of the equation (11b) and its weight parameter W has been described. However, the essence of the present invention is to secure safety by widening the distance between the vehicle 001 (control target) and the pedestrian 002 (non-control target) when the reaching region of the control target and the reaching region of the non-control target intersect with each other, that is, the possibility of collision is present.

Therefore, when the distance between the vehicle 001 and the pedestrian 002 can be widened, the penalty function of the equation (11b) is not necessarily required to be used. For example, as illustrated in FIGS. 8A to 8C, the model predictive control such as the equation (14) can also be used by using the parameter W which increases according to the area of the intersection region. The constraint condition of the equation (14) means that the distance between the vehicle 001 and the pedestrian 002 is prevented from being less than the W, that is, in any situation, the distance between the vehicle 001 and the pedestrian 002 becomes the W or more. By taking such a method, it is possible to achieve the movement in which the vehicle 001 avoids the pedestrian 002. The constraint condition used by the operation amount calculation unit A010 includes a minimum distance in which the control target and the non-control target can be closer to each other, and for this minimum distance, the control parameter decided by the control parameter setting unit A009 is used.

[Mathematical 14]

$$\min_{U} J \begin{cases} J = J_1 + J_2 \\ r_k - (r_p + r_q) > W \\ u_{lb} \le u_k \le u_{ub} \\ x_{lb} \le x_k \le x_{ub} \end{cases}$$

According to the first embodiment, it is possible to provide the autonomous control system and the autonomous control method in which even when it is difficult to predict a behavior of the moving body in the periphery of the autonomous driving vehicle, the autonomous driving vehicle can be driven efficiently and safely.

Second Embodiment

Next, a second embodiment of the present invention will be described.

In the first embodiment described above, the autonomous driving vehicle traveling on the general public road is the control target.

The present invention is also applicable to the autonomous driving of the system in which not only the moving body such as the vehicle 001 in which the position of the control target is greatly changed, but also only a portion of the machine, moves.

As the second embodiment of the present invention, the case where the hydraulic excavator that performs a construction work at a construction site is the control target will be described.

Figure 16A:
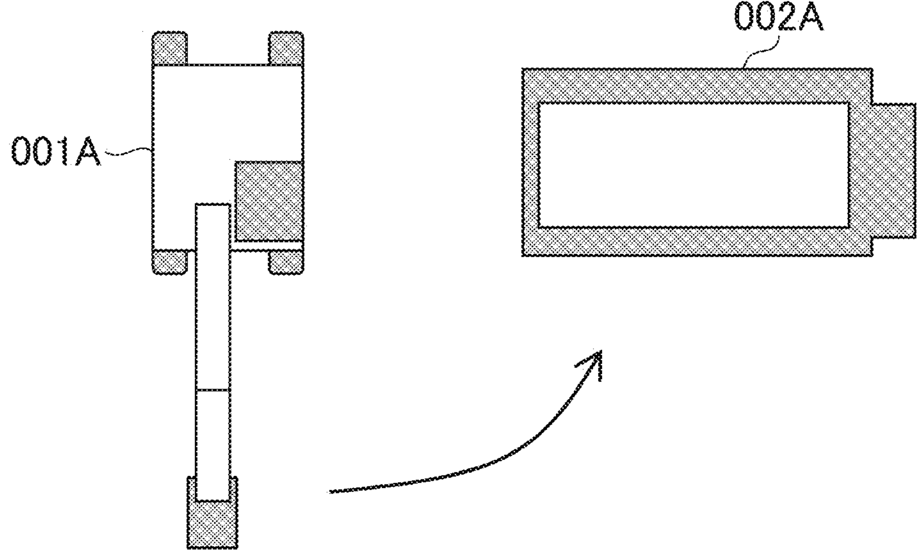
FIG. 16A is a diagram explaining a second embodiment in which the present invention is applied to a hydraulic excavator.
Figure 16B:
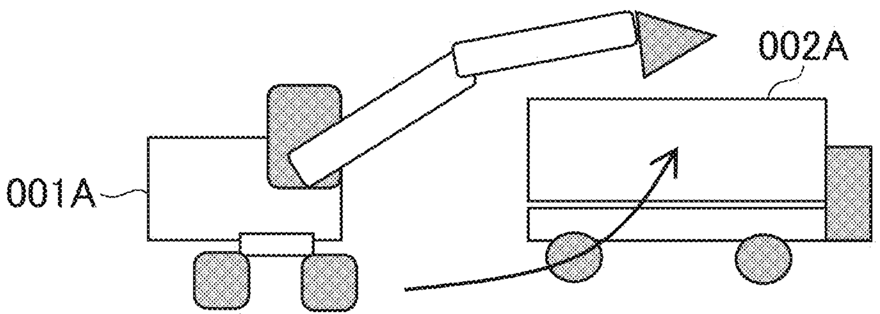
FIG. 16B is a diagram explaining the second embodiment in which the present invention is applied to the hydraulic excavator.

FIGS. 16A and 16B illustrate a hydraulic excavator 001A to which the second embodiment of the present invention is applied.

FIG. 16A is a diagram in which the initial posture of the hydraulic excavator 001A as the control target of the second embodiment is drawn from above, and FIG. 16B is a diagram in which the final posture of the hydraulic excavator 001A is drawn from the side. The hydraulic excavator 001A performs a work for loading dug soil and sand into the cargo bed of a dump truck 002A. The autonomous control system of the second embodiment of the present invention is used for controlling movement performing the loading without causing the bucket tip position of the hydraulic excavator 001A to come into contact with the dump truck 002A.

Figure 17:
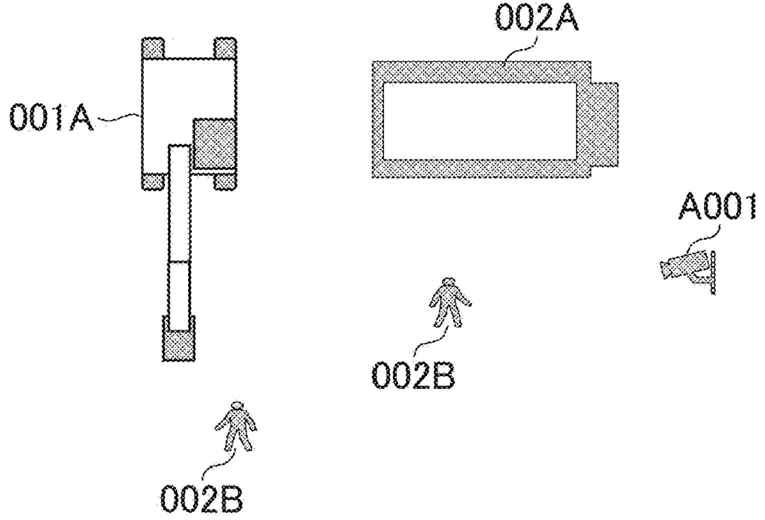
FIG. 17 is a diagram explaining the second embodiment in which the present invention is applied to the hydraulic excavator.

FIG. 17 is a diagram illustrating an example of a construction site in which the second embodiment of the present invention is applied. Note that as illustrated in FIG. 16A, FIG. 17 illustrates an initial posture of the hydraulic excavator from above. In the construction site, there are, other than the hydraulic excavator 001A and the dump truck 002A, a plurality of operators 002B for executing a fine digging work in which the hydraulic excavator 002A has difficulty in coping with the execution and monitoring the progress situation in the construction site. The hydraulic excavator 001A is equipped with the GNSS and the IMU as the state amount acquiring unit A002, thereby enabling to acquire its own position. Note that the hydraulic excavator 001A may be equipped with the LiDAR as the outside information acquiring unit A001, but in the LiDAR mounted on the hydraulic excavator 001A, acquirable peripheral information is limited, and a blind spot is likely to occur. Therefore, it is desirable that the infrastructure senor is installed in the construction site and information acquired by the infrastructure sensor is utilized.

Hereinbelow, to simplify the description, when the hydraulic excavator 001A performs the loading of soil and sand, the dump truck 002A is typically in the stop state, so that only the operator 002B is handled as the moving body as the non-control target. In the first embodiment, the situation where only one pedestrian 002 is present is assumed, but the present invention is also applicable to a situation where a plurality of pedestrians 002 (operators 002B) are present.

Figure 18:
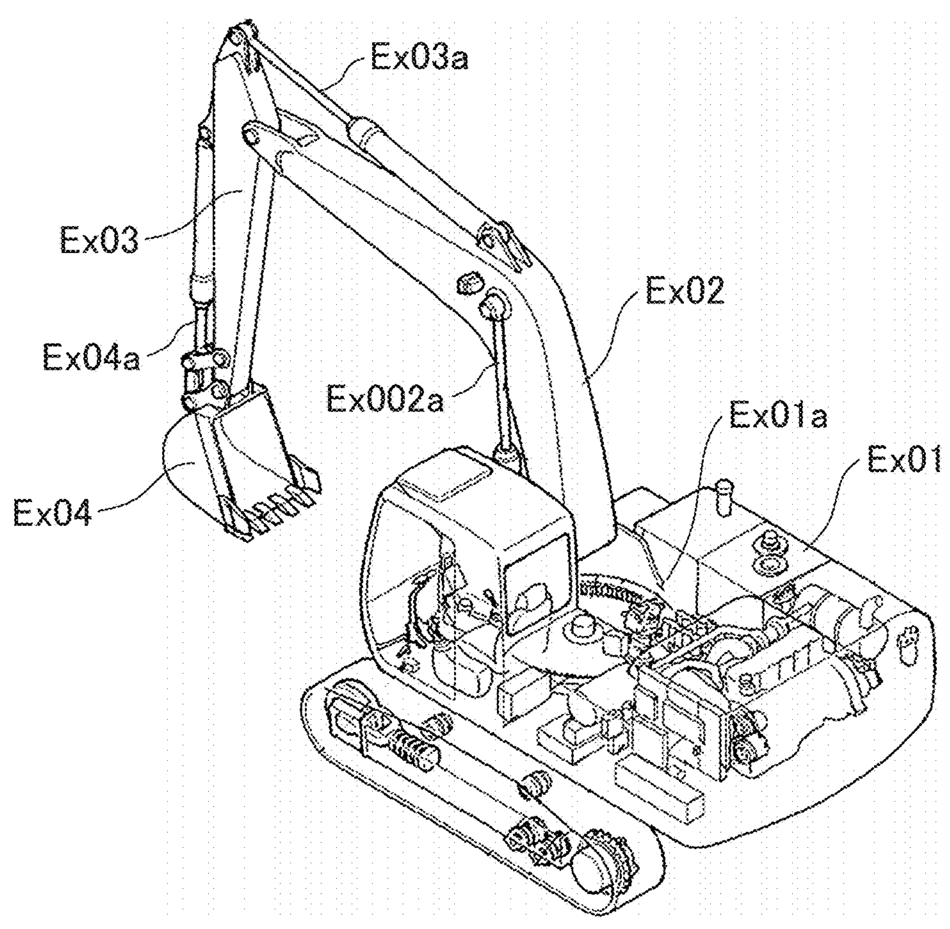
FIG. 18 is a diagram explaining configuration members of the hydraulic excavator.

To perform position control of a bucket tip of the hydraulic excavator 001A, the autonomous control system A100 of the second embodiment controls each of a turning motor Ex01*a* for controlling a posture of an upper turning body Ex01, a boom cylinder Ex02*a* for controlling a posture of a boom Ex02, an arm cylinder Ex03*a* for controlling a posture of an arm Ex03, and a bucket cylinder Ex04*a* for controlling a posture of a bucket Ex04, which are illustrated in FIG. 18.

A speed of each of the actuators Ex01*a* to Ex04*a* is the control input u, and the actual actuator displacement (turning angle, cylinder length) is calculated, so that a bucket tip position of the hydraulic excavator 001A can be calculated. That is, like the first embodiment, also for control of the bucket tip position of the hydraulic excavator 001A, a model of the control target can be given by a form of the equation (5). Further, the target bucket tip position rk is given to above a cargo bed of the dump truck 002A, which can be defined as the problem minimizing the objective function of the equation (6) like the first embodiment.

Since the vehicle 001 handled in the first embodiment can move only on the road (two-dimensional plane), it is sufficient that only the X, Y coordinates are considered. In the second embodiment, since the bucket tip (bucket Ex04) of the hydraulic excavator 001A moves in a three-dimensional space, movement on the X, Y, Z coordinates is required to be considered. Therefore, the condition for preventing the operator 002B and the bucket tip (bucket Ex04) from coming into contact with each other is also required to be considered in the three-dimensional space.

Figure 10:
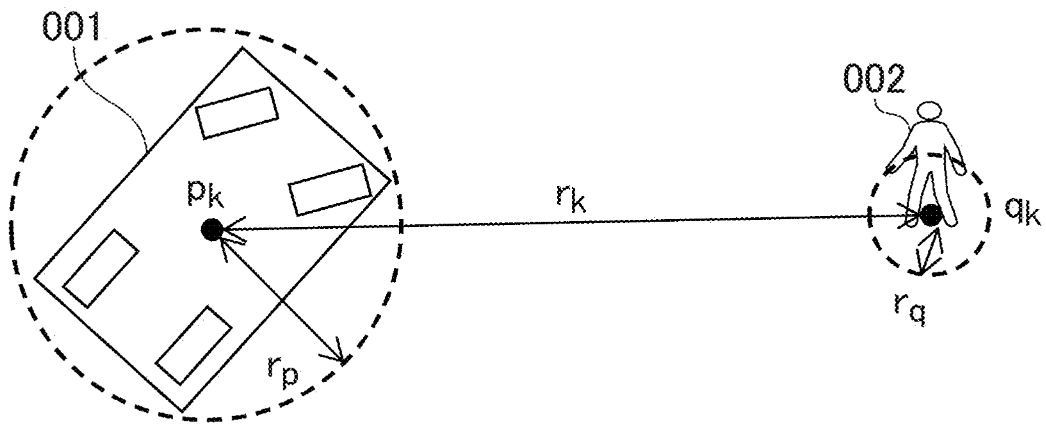
FIG. 10 is a diagram explaining the position relationship between the vehicle and a pedestrian.
Figure 19:
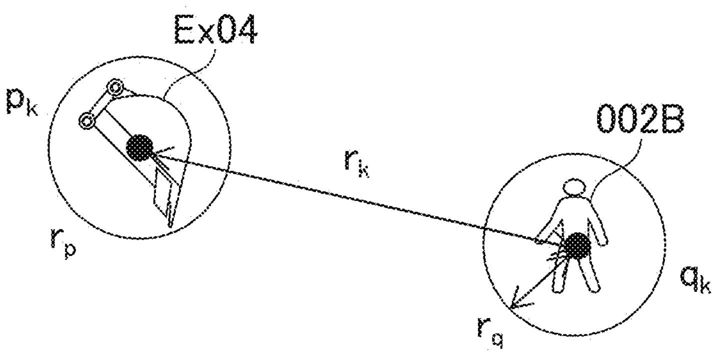
FIG. 19 is a diagram explaining the position relationship between a bucket of the hydraulic excavator and an operator.

That is, the contact of the circles on the two-dimensional plane illustrated in FIG. 10 is not considered, but like FIG. 19, the contact of the spheres in the three-dimensional space is considered. The constraint condition for preventing the sphere having the radius rp surrounding the bucket EX04 and the sphere having the radius rq surrounding the operator 002B from coming into contact with each other can be given by the equation (14). By using this constraint condition to use the model predictive control of the equation (12), safe loading movement that prevents the bucket Ex04 from coming into contact with the operator 002B can be achieved.

When the plurality of operators 002B are present, the model predictive control that considers the constraint condition of the equations (15a) to (15d) for each of the operators should be used. That is, when M operators 002B are present, like the equation (16), the model predictive control that considers M constraint conditions is handled.

[Mathematical 15]

$$r_k = \sqrt{(p_k - q_k)^T (p_k - q_k)} \tag{15a}$$

$$p_k = [X_k \; Y_k \; Z_k]^T \tag{15b}$$

$$q_k = [X_k^q \; Y_k^q \; Z_k^q]^T \tag{15c}$$

$$r_k - (r_p + r_q) > 0 \tag{15d}$$

[Mathematical 16]

$$\min_U J \begin{cases} J = J_1 + J_2 + J_3 \\ u_{lb} \le u_k \le u_{ub} \\ x_{lb} \le x_k \le x_{ub} \\ r_{k,i} - (r_p + r_{q,i}) > 0 \\ r_{k,i} = \sqrt{(p_k - q_{k,i})^T (p_k + q_{k,i})} \\ q_{k,i} = \left[X_k^{q,i} \; Y_k^{q,i} \; Z_k^{q,i}\right]^T \end{cases}$$

$$i = 1, \ldots, M$$

Note that the second embodiment has been described by taking, as an example, the loading movement, but needless to say, the application range of the present invention is not limited to the loading movement. That is, the present invention is applicable to all of works necessary for construction, such as a trench digging work and a leveling work. Specifically, in the case of the trench digging work, by using the bucket end position of the hydraulic excavator as the xk, the control input u should be calculated so as to minimize the objective function of the equation (6) while the coordinates of the target position rk are sequentially changed according to the shape of the trench.

Unlike the general public road, the construction site is a managed area, so that there is a great difference in that an ordinary person (the pedestrian 002, the bicycle 005) cannot intrude into the construction site, and only the construction work employee is present. With such a condition, safety awareness of the operator 002B in the site can be managed.

For example, it can be considered that a person taking safety training and the skilled operator 002B having long working years have high safety awareness as compared with the operator 002B having short working years. Since the operator 002B having high safety awareness knows well a behavior of the hydraulic excavator 001A, he/she can advance the work while appropriately predicting movement of the hydraulic excavator 001A.

In this way, in the case of the situation where the operator 002B side works while paying attention to safety, it is desirable that the hydraulic excavator 001A is moved in the shortest path by focusing on efficiency. On the other hand, in the case of the abnormal situation where the operator 002B side is required to be nervous with safety, it is desirable that by focusing on safety, the hydraulic excavator 001A is moved so as not to bring the bucket Ex04 closer to the operator 002B as much as possible.

Movement of each of these can be switched by changing the magnitude of the weight parameter W in the equation (11a). Specifically, when the weight parameter W is small, the hydraulic excavator 001A performs movement focusing on efficiency, and on the other hand, when the weight parameter W becomes larger, the hydraulic excavator 001A performs movement ignoring safety.

Figure 20:
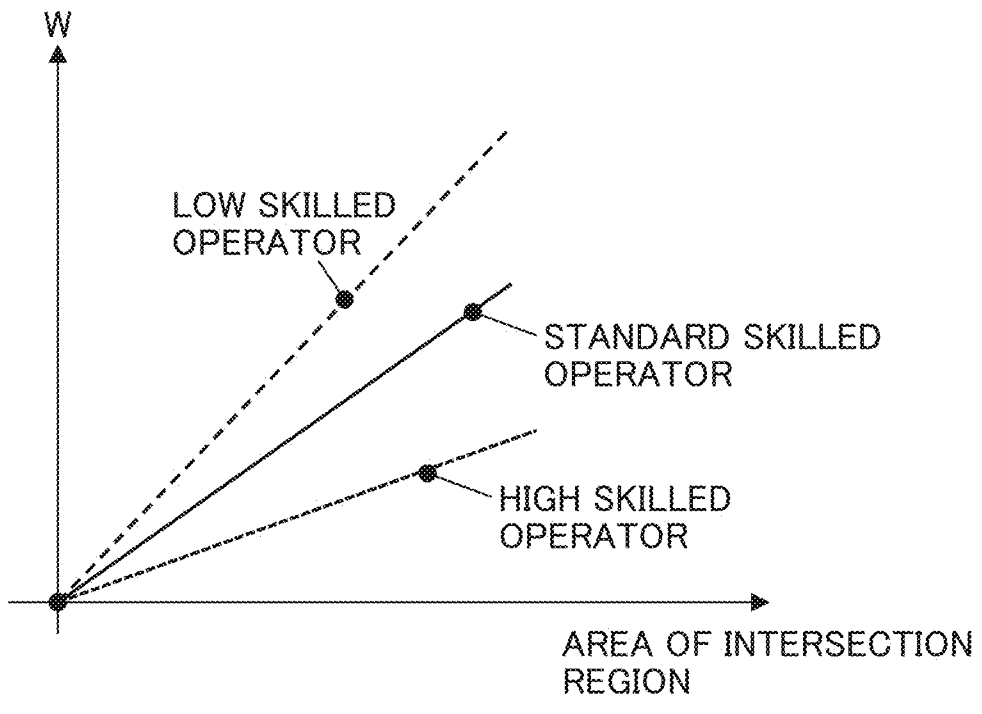
FIG. 20 is a diagram explaining a parameter setting method using a skill degree of the operator.

To achieve such a characteristic, as illustrated in FIG. 20, it is desirable that the control parameter setting unit A009 is caused to change the weight parameter W according to a skill degree of the operator 002B present in the working site. Note that when the operators 002B having different skill degrees are present, the characteristic according to a level of the operator 002B having low skill degree may be used, and the characteristic according to a level of each operator 002B may be used. When the latter method is selected, M types of weight parameters W are present, so that attention is required in that the objective function $J_3$ is required to be changed like the equations (17a) and (17b).

[Mathematical 17]

$$J_3 = \sum_{i=1}^{M} W_i \sum_{k=k_0}^{N+k_0} l(p_k, q_{k,i}) \tag{17a}$$

$$l(p_k, q_{k,i}) = \frac{1}{a\{r_{k,i} - (r_q + r_p)\}^2 + \varepsilon} \tag{17b}$$

In order that the autonomous control system A100 acquires the skill degree of each operator 002B, it is desirable that the operator 002B is caused to have each beacon, and each beacon and the skill degree of the operator 002B are associated with each other.

According to the second embodiment, it is possible to provide the autonomous control system and the autonomous control method in which even when it is difficult to predict a behavior of the moving body in the periphery of the hydraulic excavator as the control target, the hydraulic excavator can be driven efficiently and safely.

Third Embodiment

Next, a third embodiment of the present invention will be described.

In the first embodiment and the second embodiment, the non-control target is the moving body (the pedestrian 002, the operator 002B) moving on the two-dimensional plane, but in the invention of the third embodiment, the non-control target is the moving body moving in the three-dimensional space.

Figure 21:
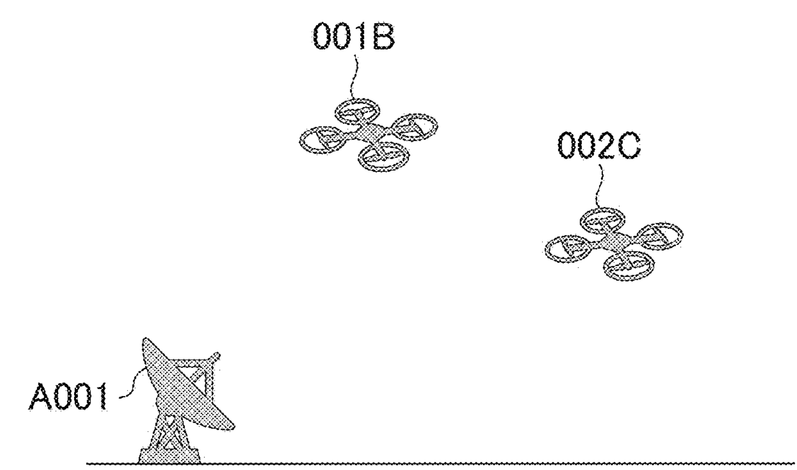
FIG. 21 is a diagram explaining a third embodiment in which the present invention is applied to a flying body.

In the third embodiment, as illustrated in FIG. 21, a situation where a plurality of flying bodies are flying in a particular limited area is assumed. A flying body 002C as the non-control target may be controlled by an operator by manual operation, or may be automatically controlled by a control system different from the autonomous control system A100 of the present invention.

A flying body 001B as the control target is equipped with the GNSS and the IMU as the state amount acquiring unit A002, and can acquire its own position. On the other hand, since the flying body 001B is limited in weight, it is difficult to mount the LiDAR for confirming the periphery, so that it is desirable that the outside information acquiring unit A001 is acquired by an outside sensor.

The flying body 001B and the flying body 002C can freely move in the three-dimensional space, so that for dynamics for predicting a behavior of the flying body 002C as the non-control target, an equation considering the height direction (Z) like the equation (18), not the equation (2) used for predicting the behavior of the pedestrian 002, is used.

Likewise, both the flying body 001B as the control target and the flying body 002C as the non-control target move in the three-dimensional space, so that all of the control target reaching region calculation unit A007, the non-control target reaching region calculation unit A006, and the intersection region calculation unit A008 are required to be changed to the calculation in the three-dimensional space. However, the basic idea is the same as the first embodiment or the second embodiment.

Figure 22:
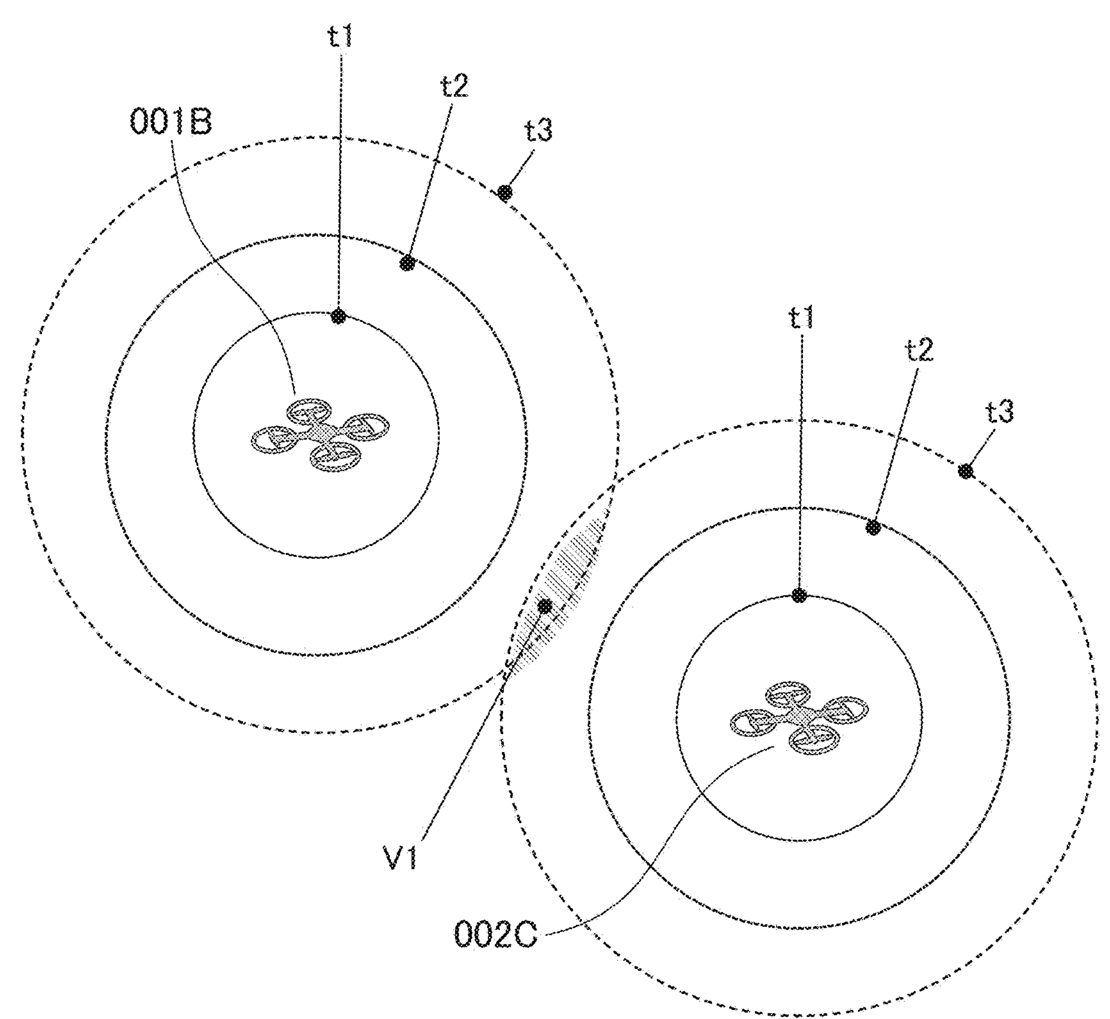
FIG. 22 is a diagram explaining the position relationship between the flying body as a control target and the flying body as a non-control target.

That is, as illustrated in FIG. 22, the reaching region is expressed by the sphere, and the first intersection region A1 should be handled as the volume V1, not as the area, and since the process thereafter follows the first embodiment or the second embodiment, the description is omitted.

[Mathematical 18]

$$\begin{cases} X_k = X_{k-1} + \Delta t \cdot v_{k-1}^X + w_X \\ Y_k = Y_{k-1} + \Delta t \cdot v_{k-1}^Y + w_Y \\ Z_k = Z_{k-1} + \Delta t \cdot v_{k-1}^Z + w_Z \\ v_k^X = v_{k-1}^X + w_{Xv} \\ v_k^Y = v_{k-1}^Y + w_{Yv} \\ v_k^Z = v_{k-1}^Z + w_{Zv} \end{cases}$$

According to the embodiment, it is possible to provide the autonomous control system and the autonomous control method in which even when it is difficult to predict a behavior of the moving body in the periphery of the flying body as the control target, the flying body can be driven efficiently and safely.

The embodiments of the present invention have been described above in detail by taking, as examples, the autonomous driving vehicle 001 traveling on the general public road, the hydraulic excavator 001A as the construction machine in the construction site, and the flying body 001B flying in the limited region, but needless to say, the application of the present invention is not limited to these cases. For example, the autonomous control system and the autonomous control method of the present invention can be utilized for a conveying vehicle in a harbor, a robot moving in a theme park, and the like.

LIST OF REFERENCE SIGNS

001: vehicle, 001A: hydraulic excavator, 001B: flying body, 002: pedestrian, 002A: dump truck, 002B: operator, 002C: flying body, 003: infrastructure sensor, 004: wireless system, 005: bicycle, 007: vehicular road, 008: management range by outside information acquiring unit, 009: pedestrian road, A1: first intersection region, A2: second intersection region, A001: outside information acquiring unit, A002: state amount acquiring unit, A003: control target position identification unit, A004: target distinguishing unit, A005: non-control target position identification unit, A006: non-control target reaching region calculation unit, A006*a*: trajectory prediction unit, A006*b*: reachable region calculation unit, A007: control target reaching region calculation unit, A008: intersection region calculation unit, A009: control parameter setting unit, A010: operation amount calculation unit, A100: autonomous control system.

The invention claimed is:

1. An autonomous control system comprising:

a state amount acquiring unit that acquires a state amount of a control target;

a control target position identification unit that identifies a position of the control target on the basis of the state amount;

a control target reaching region calculation unit that calculates a control target reaching region that the control target can reach within a predetermined time on the basis of the position of the control target;

an outside information acquiring unit that acquires outside information of the control target;

a target distinguishing unit that distinguishes an attribute of a non-control target on the basis of the outside information;

a non-control target position identification unit that calculates a position of the non-control target on the basis of the outside information;

a non-control target reaching region calculation unit that uses the attribute and the position, to calculate a non-control target region that the non-control target can reach within a predetermined time, wherein the attribute is used to classify a movement potential of the non-control target for calculating the non-control target region based at least on holonomic constraints associated with each different classification;

an intersection region calculation unit that uses a set of the positions of the control target and the set of the positions of the non-control target calculated by the non-control target reaching region calculation unit, to calculate an intersection region of the sets of the respective positions;

a control parameter setting unit that sets a control parameter of the control target such that as an intersection amount region of the intersection region of the sets of the respective positions is larger, a behavior in which the control target widens the distance between the control target and the non-control target is generated; and an operation amount calculation unit that uses the control parameter and an objective function whose value becomes smaller as the control target is closer to the desirable behavior, to calculate a control input such that the value of the objective function becomes a smaller value than the previous value in the range in which a predetermined constraint condition is satisfied.

2. The autonomous control system according to claim 1, wherein the non-control target reaching region calculation unit uses the attribute distinguished by the target distinguishing unit and the position of the non-control target calculated by the non-control target position identification unit, to calculate a predictive trajectory as a set of trajectories through which the non-control target passes within the predetermined time and the non-control target region that the non-control target can reach within the predetermined time, wherein the intersection region calculation unit calculates a first intersection region by using the set of the positions of the control target calculated by the control target reaching region calculation unit and the set of the positions of the non-control target calculated by the non-control target reaching region calculation unit, and calculates a second intersection region by using the set of the positions of the control target calculated by the control target reaching region calculation unit and the set of the predictive trajectories calculated by the non-control target reaching region calculation unit, and wherein the control parameter setting unit sets the control parameter such that even in a situation where the values of the set of the first intersection region are the same value, as the set of the second intersection region is larger, the behavior in which the distance between the control target and the non-control target is widened is generated.

3. The autonomous control system according to claim 1, wherein the information distinguished by the target distinguishing unit includes, in addition to the movement potential of the non-control target, a movement characteristic regarding safe movement that can be taken by the non-control target, and wherein the control parameter setting unit sets the control parameter such that even when the values of the set of the intersection region calculated by the intersection region calculation unit are the same, as the non-control target has the movement characteristic in which the non-control target is less likely to take the safe movement, the behavior in which the distance between the control target and the non-control target is widened is generated.

4. The autonomous control system according to claim 1, wherein the intersection region calculation unit uses the set of the positions at respective times of the control target calculated by the control target reaching region calculation unit and the set of the positions at respective times of the non-control target calculated by the non-control target reaching region calculation unit, to calculate the intersection region of the sets of the respective positions at the respective times, and wherein the control parameter setting unit sets the control parameter such that even when the values of the set of the intersection region calculated by the intersection region calculation unit are the same values, as the values of the set of the intersection region at the same time of the set of the positions at the respective times of the control target and the set of the positions at the respective times of the non-control target are larger, the behavior in which the distance between the control target and the non-control target is widened is generated.

5. The autonomous control system according to claim 1, wherein the objective function that is used in the operation amount calculation unit includes the product of a penalty function whose value becomes larger as the distance between the control target and the non-control target is smaller and the control parameter decided by the control parameter setting unit.

6. The autonomous control system according to claim 1, wherein the constraint condition includes a minimum distance in which the control target and the non-control target can be closer to each other, and for the minimum distance, the control parameter decided by the control parameter setting unit is used.

7. The autonomous control system according to claim 1, wherein the control target is a vehicle.

8. The autonomous control system according to claim 1, wherein the control target is a hydraulic excavator.

9. The autonomous control system according to claim 1, wherein the control target is a flying body.

10. An autonomous control method comprising:

acquiring a state amount of a control target;

identifying a position of the control target on the basis of the state amount;

calculating a control target reaching region that the control target can reach within a predetermined time on the basis of the position of the control target;

acquiring outside information of the control target;

distinguishing an attribute of a non-control target on the basis of the outside information;

calculating a position of the non-control target on the basis of the outside information;

using the attribute and the position, calculating a non-control target region that the non-control target can reach within a predetermined time, wherein the attribute is used to classify a movement potential of the non-control target for calculating the non-control target region based at least on holonomic constraints associated with each different classification;

using a set of the positions of the control target and a set of the positions of the non-control target, calculating an intersection region of the sets of the respective positions;

setting a control parameter of the control target such that as an intersection amount region of the intersection region of the sets of the respective positions is larger, a behavior in which the control target widens the distance between the control target and the non-control target is generated; and using the control parameter and an objective function whose value becomes smaller as the control target is closer to the desirable behavior, calculating a control input such that the value of the objective function becomes a smaller value than the previous value in the range in which a predetermined constraint condition is satisfied.

11. The autonomous control method according to claim 10, comprising:

using the attribute and the position of the non-control target, calculating a predictive trajectory as a set of trajectories through which the non-control target passes within the predetermined time and the non-control target region that the non-control target can reach within the predetermined time;

calculating a first intersection region by using the set of the positions of the control target and the set of the positions of the non-control target, and calculating a second intersection region by using the set of the positions of the control target and the set of the predictive trajectories; and setting the control parameter such that even in a situation where the values of the set of the first intersection region are the same value, as the set of the second intersection region is larger, the behavior in which the distance between the control target and the non-control target is widened is generated.

* * * * *